(12) United States Patent
Goto et al.

(10) Patent No.: US 9,701,270 B2
(45) Date of Patent: Jul. 11, 2017

(54) SIDE AIRBAG SYSTEM

(71) Applicant: TOYODA GOSEI CO., LTD., Kiyosu-shi, Aichi-ken (JP)

(72) Inventors: Yoshiaki Goto, Kiyosu (JP); Kensaku Honda, Kiyosu (JP); Akira Suzuki, Kiyosu (JP); Masao Kino, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/207,551

(22) Filed: Jul. 12, 2016

(65) Prior Publication Data
US 2017/0028958 A1    Feb. 2, 2017

(30) Foreign Application Priority Data
Jul. 31, 2015  (JP) .................. 2015-151869

(51) Int. Cl.
*B60R 21/207* (2006.01)
*B60R 21/215* (2011.01)
*B60R 21/231* (2011.01)
*B60R 21/237* (2006.01)

(52) U.S. Cl.
CPC .......... *B60R 21/215* (2013.01); *B60R 21/207* (2013.01); *B60R 21/237* (2013.01); *B60R 21/23138* (2013.01); *B60R 2021/23146* (2013.01)

(58) Field of Classification Search
CPC ................ B60R 21/215; B60R 21/207; B60R 21/23138; B60R 21/237; B60R 2021/23146
See application file for complete search history.

(56) References Cited

U.S. PATENT DOCUMENTS

| 6,045,151 | A | * | 4/2000 | Wu | ........................ | B60R 21/207 |
|---|---|---|---|---|---|---|
| | | | | | | 280/728.3 |
| 6,099,026 | A | | 8/2000 | Ando et al. | | |
| 6,206,410 | B1 | * | 3/2001 | Brown | .................. | B60R 21/207 |
| | | | | | | 280/728.3 |
| 6,364,347 | B1 | * | 4/2002 | Holdampf | ............ | B60N 2/5825 |
| | | | | | | 280/728.1 |

(Continued)

FOREIGN PATENT DOCUMENTS

| JP | S50-131742 A | 4/1974 |
|---|---|---|
| JP | H10-244895 A | 9/1998 |

*Primary Examiner* — Faye M Fleming
(74) *Attorney, Agent, or Firm* — Posz Law Group, PLC

(57) ABSTRACT

A side airbag system includes: an airbag; and a wrapping material that is disposed around a folded-up airbag body into which the airbag is folded so as to prevent the collapse of neatly arranged folds of the folded-up airbag body, the folded-up airbag body being configured as an elongated body having an external shape that is disposed so that a longitudinal direction thereof substantially follows an up-to-down direction, wherein: the wrapping material is disposed so as to wrap around the folded-up airbag body, including a brake planned portion capable of breaking when the airbag inflates which is provided on a front surface side of the folded-up airbag body so as to substantially follow the up-to-down direction; and the break planned portion comprises a low-strength portion where a break strength thereof is set low and a high-strength portion where the break strength is set high.

7 Claims, 29 Drawing Sheets

(56) References Cited

U.S. PATENT DOCUMENTS

| | | | | |
|---|---|---|---|---|
| 6,382,665 B2* | 5/2002 | Holdampf | ............ | B60N 2/5825 |
| | | | | 280/728.1 |
| 6,520,533 B2* | 2/2003 | Tanase | ................. | B60R 21/213 |
| | | | | 280/730.2 |
| 6,742,806 B2* | 6/2004 | Ogawa | ................. | B60R 21/213 |
| | | | | 280/732 |
| 8,272,665 B2* | 9/2012 | Messina | ................ | B60R 21/207 |
| | | | | 280/728.2 |
| 8,840,140 B2* | 9/2014 | Mendez | ............. | B60R 21/2338 |
| | | | | 280/743.2 |
| 2016/0185313 A1* | 6/2016 | Lafferty | ................ | B60R 21/201 |
| | | | | 280/728.3 |

* cited by examiner

A.

B.

SIDE AIRBAG SYSTEM

CROSS-REFERENCE TO RELATED APPLICATION(S)

This application is based upon and claims the benefit of priority from Japanese Patent Application No. 2015-151869, filed on Jul. 31, 2015, the entire contents of which are incorporated herein by reference.

BACKGROUND

1. Field of the Invention

The present invention relates to a side airbag system that includes an airbag that is folded up to be accommodated in a seatback of a seat of a vehicle and a wrapping material that is disposed around a folded-up airbag body that is formed by folding up the airbag so as to prevent the collapse of neatly arranged folds of the folded-up airbag body.

2. Description of the Related Art

In a conventional side airbag system, as a wrapping material that is disposed around a folded-up airbag body, there is a wrapping material that is formed of a piece of flexible woven fabric to be placed around a folded-up airbag body so as to cover substantially a whole surface thereof and which includes a rupture or break planned portion where the airbag can be broken when it inflates (for example, refer to JP-A-H10-244895). This break planned portion has a plurality of main slits that are formed in the wrapping material by making broken cuts into a straight line and auxiliary slits that are formed on sides of joint portions between the main slits, so that the airbag can break quickly when the air bag is inflated to be deployed.

In this conventional side airbag system, since the break planned portion includes the main slits and the auxiliary slits, the break planned portion quickly breaks when the airbag is inflated to be deployed, enabling the inflation of the airbag. However, a case is not taken into consideration where the airbag is inflated to be deployed with an obstacle such as an occupant sitting too closely in front of the accommodating portion where the folded-up airbag body is accommodated. In this conventional side airbag system, there is still room for improvement in suppressing the risk of the obstacle being pressed strongly by the inflating airbag when the obstacle lies too close to the folded-up airbag body.

SUMMARY

The invention has been made in view of solving the problem described above and an object thereof is to provide a side airbag system that can suppress the risk of an obstacle being pressed strongly by an inflating airbag when the obstacle lies too close to the airbag.

According to an aspect of the invention, there is provided a side airbag system including: an airbag that is folded up to be accommodated in an accommodating portion that is formed in a seatback of a seat of a vehicle and which is configured to inflate while projecting to the front by allowing an inflation gas to enter an interior thereof; and a wrapping material that is disposed around a folded-up airbag body into which the airbag is folded so as to prevent the collapse of neatly arranged folds of the folded-up airbag body, the folded-up airbag body being configured as an elongated body having an external shape that is disposed so that a longitudinal direction thereof substantially follows an up-to-down direction, wherein: the wrapping material is formed of a flexible sheet material and is disposed so as to wrap around the folded-up airbag body, including a brake planned portion capable of breaking when the airbag inflates which is provided on a front surface side of the folded-up airbag body so as to substantially follow the up-to-down direction; and the break planned portion comprises a low-strength portion where a break strength thereof is set low and a high-strength portion where the break strength is set high.

In the side airbag system of the invention, since the break planned portion formed on the wrapping material has the high-strength portion where the break strength is set high, it is difficult for this high-strength portion to break when the airbag inflates, whereby the airbag that is inflating is temporarily restrained from projecting to the front by the wrapping material. Thereafter, the high-strength portion is broken, allowing the airbag to project to the front. Owing to this configuration, the airbag inflates while being restrained from projecting to the front greatly at the portion where the high-strength portion is provided in an initial stage of inflation. Therefore, even in case the airbag inflates with an obstacle such as an occupant positioned close in front of the accommodating portion (in an obstacle close positioned state), the obstacle can be restrained from being pressed strongly by the inflating airbag by adopting a configuration in which the high-strength portion is disposed in a position that corresponds to the obstacle.

Consequently, in the side airbag system of the invention, with the obstacle positioned close to the accommodating portion, the obstacle can be restrained from being pressed strongly by the inflating airbag.

In the side airbag system of the invention, the break planned portion also has the low-strength portion where the break strength is set low, and this low-strength portion breaks quickly when the airbag inflates. In the event that the airbag inflates with the occupant sitting in a seat (a normal occupant protection), the whole of the break planned portion is allowed to break quickly in association with the quick break of the low-strength portion, whereby the airbag is allowed to complete its inflation without a great delay from an inflation completing time that is necessary to protect the occupant accurately. As a result, in the normal occupant protection, the airbag is allowed to inflate quickly, whereby the occupant sitting in the seat can be protected accurately by the airbag that has completed its inflation.

In the side airbag system of the invention, in case an opening portion that constitutes an originating point of break is provided between the low-strength portion and the high-strength portion, the low-strength portion and the high-strength portion can start breaking from the opening portion as the originating point of break separately according to their strengths. Therefore, it is preferable that an accurate time difference can be provided between timings at which the low-strength portion and the high-strength portion start breaking.

In the side airbag system configured as described above, it is preferable that the wrapping material is configured to expose at least one end portion of the folded-up airbag body in the up-to-down direction and that the low-strength portion is provided close to an exposed portion of the folded-up airbag body.

With the side airbag system configured in the way described above, since at least one end portion of the folded-up airbag body in the up-to-down direction is exposed from the wrapping material, the exposed portion is allowed to inflate quickly. Additionally, since the low-strength portion of the break planned portion that is formed on the wrapping material is provided close to the exposed portion, the break planned portion breaks sequentially from the low-strength portion when the exposed portion inflates, and the whole of the airbag is allowed to inflate so as to project greatly to the front while the break planned portion is being broken quickly.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
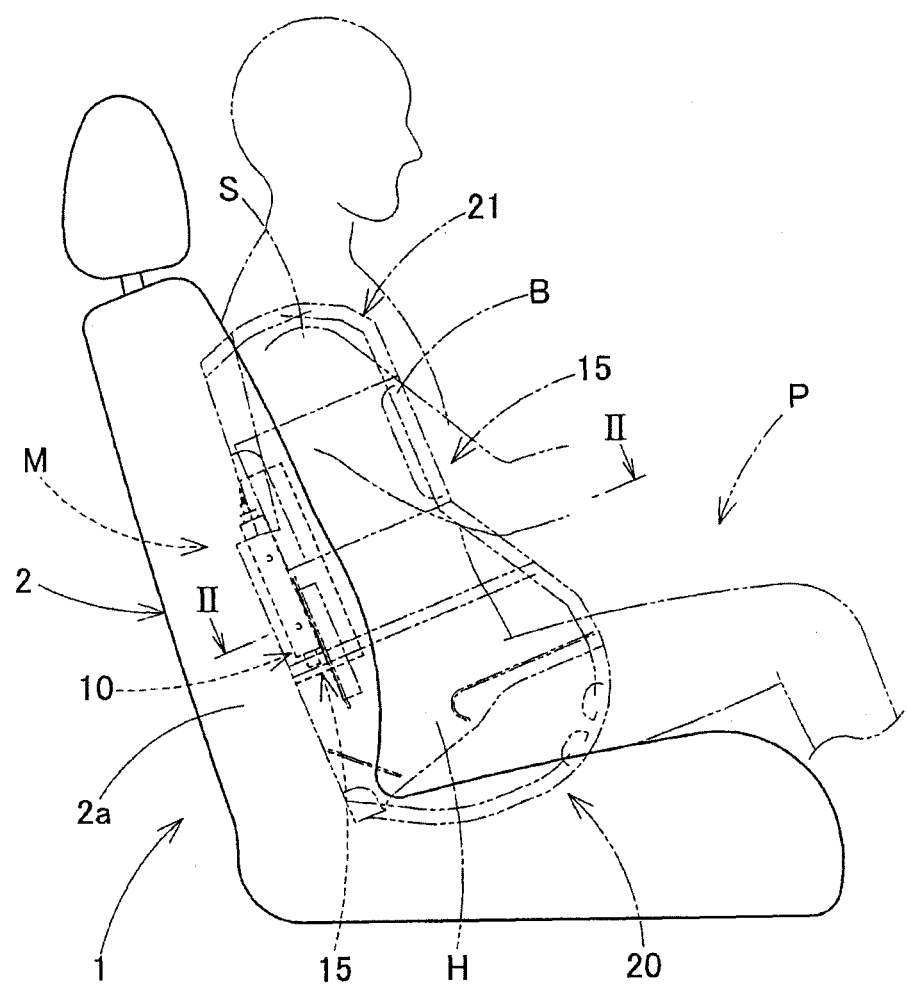
FIG. 1 is a side view of a side airbag system according to one embodiment of the invention, showing a form in which the side airbag system is in used.
Figure 2:
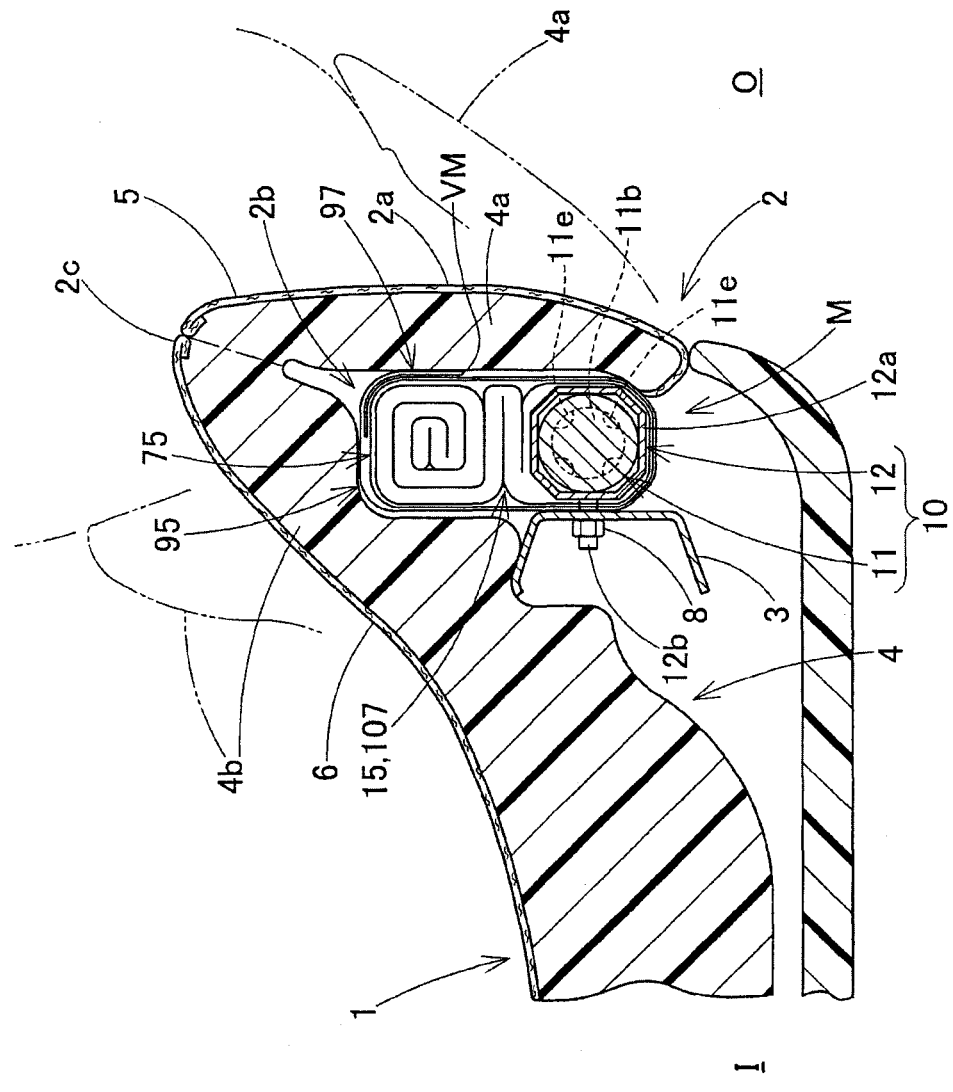
FIG. 2 is a schematic cross-sectional view of the side airbag system according to the embodiment taken along a line II-II in FIG. 1.

Hereinafter, an embodiment of the invention will be described. A side airbag system (hereinafter, referred to as an "airbag system") M of this embodiment is accommodated in an accommodating portion 2b that is formed underneath a side surface 2a of a seatback 2 of a seat 1 of a vehicle on an outboard side O (a right-hand side in the case of this embodiment) of the seat back 2 as shown in FIGS. 1 and 2. In this embodiment, directions such as up-to-down, front-to-rear and left-to-right directions coincide with up-to-down, front-to-rear and left-to-right directions of the vehicle unless otherwise described particularly.

A seat frame 3 is provided in the seatback 2 so as to follow substantially an up-to-down direction. The airbag system M is fixed to the seat frame 3 by fastening mounting bolts 12b that project from a retainer 12 of an inflator 10 with a nut 8, as shown in FIG. 2. FIG. 2 also shows a cushion 4 and skins 5, 6 of decorative cloth. Further, an edge portion 4a on the right-hand side (the outboard side O) of the cushion 4 covers the airbag system M from a front side to the outboard side O. This edge portion 4a is pushed by an airbag 15 to be separated from a central portion 4b of the cushion 4 when the airbag 15 inflates.

In the case of this embodiment, as shown in FIG. 2, the airbag system M includes the airbag 15 that is folded up, the inflator 10 that supplies an inflation gas to the airbag 15, a wrapping material 75 that wraps around a folded-up airbag body 107 that is formed by folding up the airbag 15, and a restraint member 95 that is disposed around the folded-up airbag body 107 that is covered therearound by the wrapping material 75.

Figure 3:
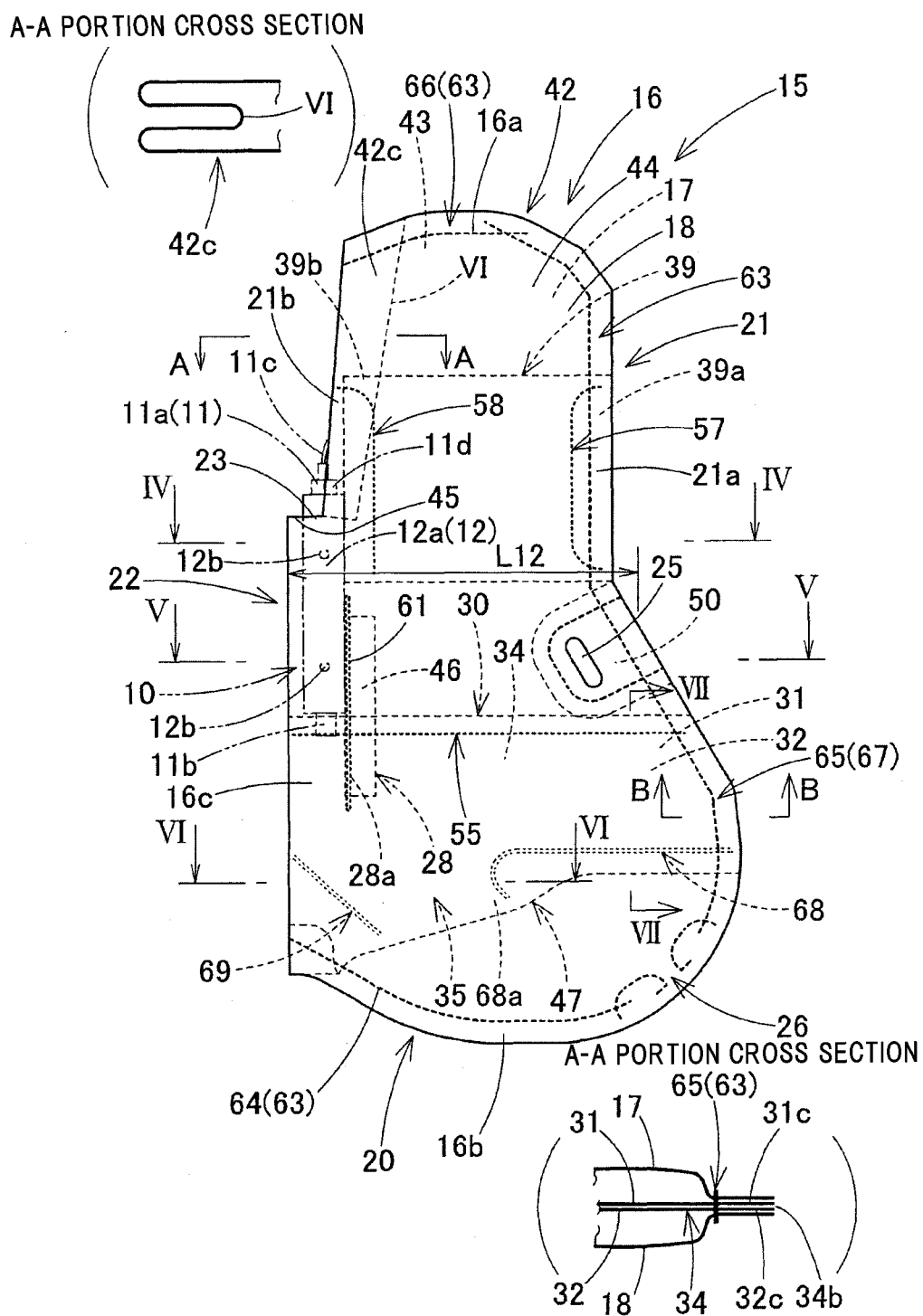
FIG. 3 is a front view of an airbag that is used in the side airbag system according to the embodiment.
Figure 4:
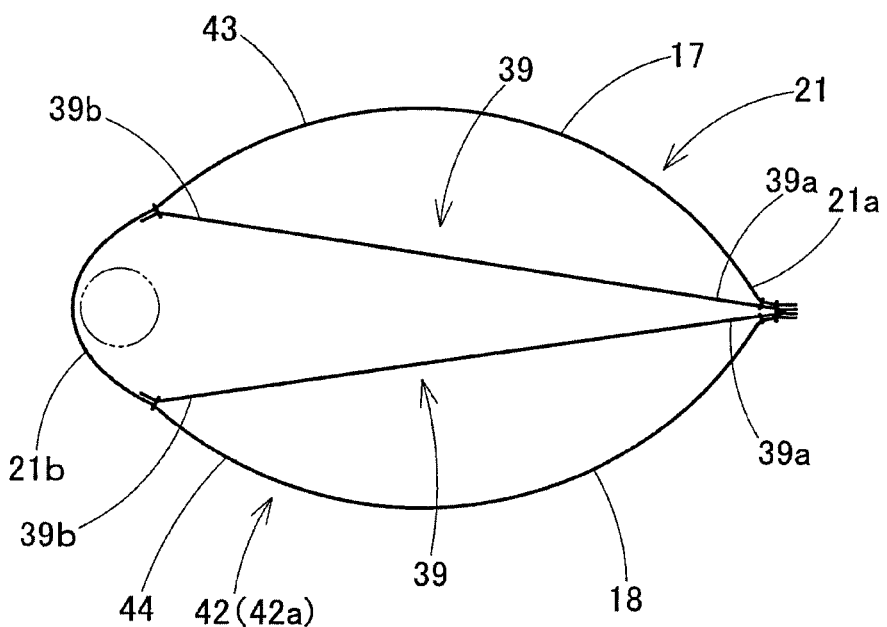
FIG. 4 is a sectional view taken along a portion IV-IV in FIG. 3.
Figure 5:
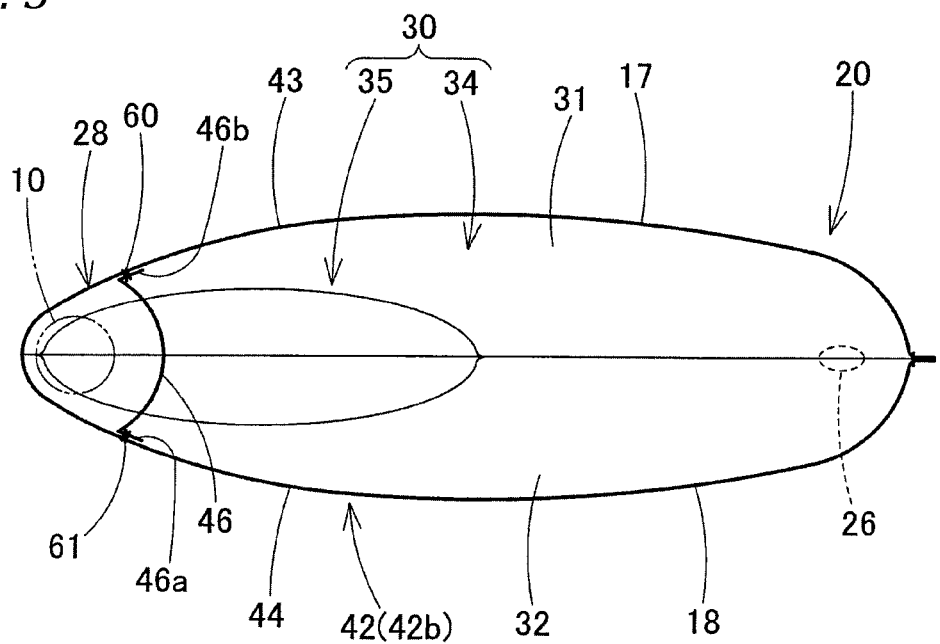
FIG. 5 is a sectional view taken along a portion V-V in FIG. 3.
Figure 23:
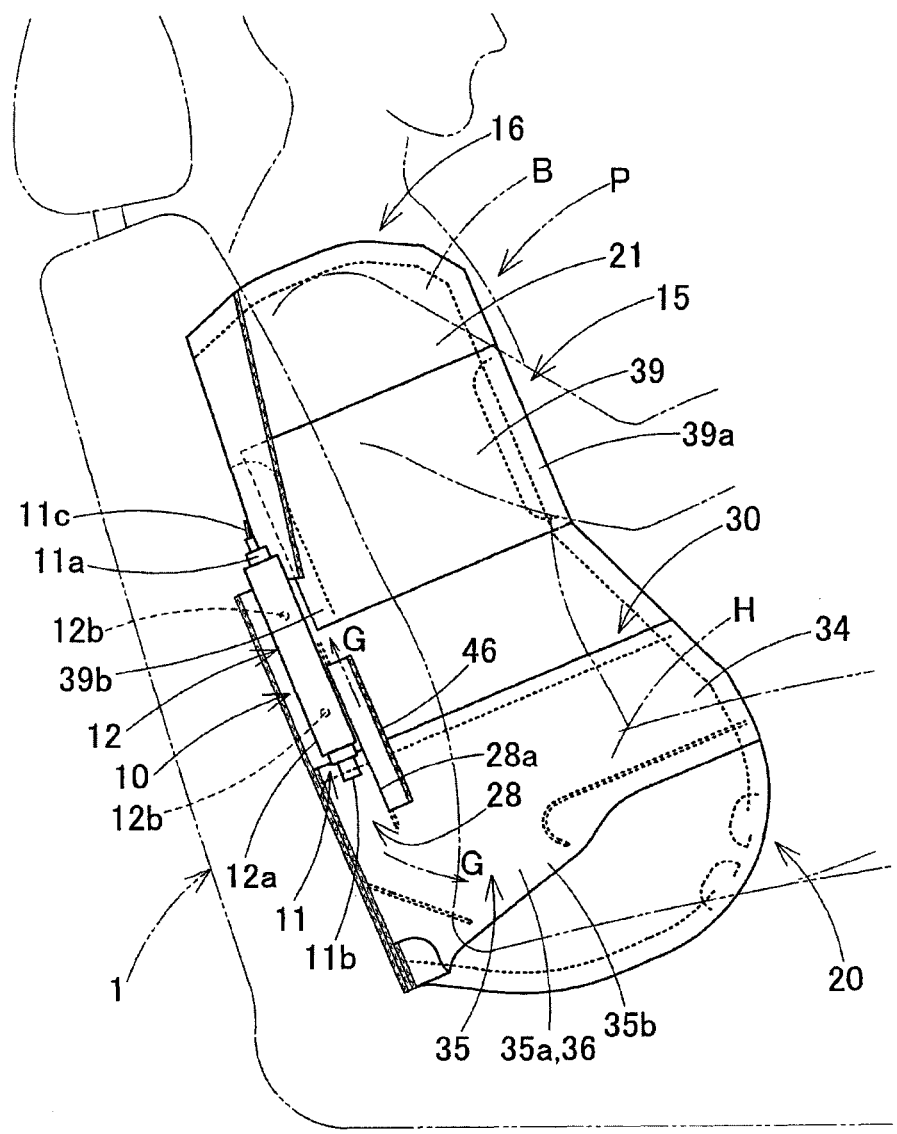
FIG. 23 is a schematic vertical sectional view of the side airbag system of the embodiment, showing a state in which the airbag completes its inflation.

As shown in FIGS. 2, 3 and 23, the inflator 10 includes a substantially cylindrical main body 11 and the retainer 12 that is provided around the main body 11. In the case of this embodiment, the main body 11 includes a large-diameter portion 11a having a substantially cylindrical external shape and a small-diameter portion 11b that is provided at a lower end side of the large-diameter portion 11a and which has a gas discharge port 11e. A lead wire 11c is connected to an upper end 11d side of the main body 11. The retainer 12 includes a substantially cylindrical holding portion 12a that can hold the main body 11 and the mounting bolts 12b that project to a left-hand side (an inboard side I) from the holding portion 12a to be disposed in two locations along the up-to-down direction. In the case of this embodiment, the inflator 10 is inserted into the airbag 15 with the mounting bolts 12b caused to project from mounting holes 22a described later, of the airbag 15 and the upper end 11d side of the main body 11 caused to project from an inserting opening 23 described later. The mounting bolts 12b projecting from the airbag 15 are caused to project from the seat frame 3 by way of mounting holes 77a of the wrapping material 75 and insertion holes 96a of the restraint member 95 and are then fastened by the nuts 8, whereby the inflator 10 is fixed to the seat frame 3 together with the airbag 15. The inflator 10 is accommodated at a rear end side in an interior of the folded-up airbag body 107 (refer to FIGS. 2 and 3).

In the case of this embodiment, the airbag 15 includes, as shown in FIGS. 3 to 7, a bag main body 16 that can inflate using the inflation gas that is caused to flow in an interior thereof, an inner tube 28, a dividing wall 30 that divides an area within the bag main body 16 and restricting pieces 39 that restrict the shape of the bag main body 16 when it completes its inflation.

Figure 8:
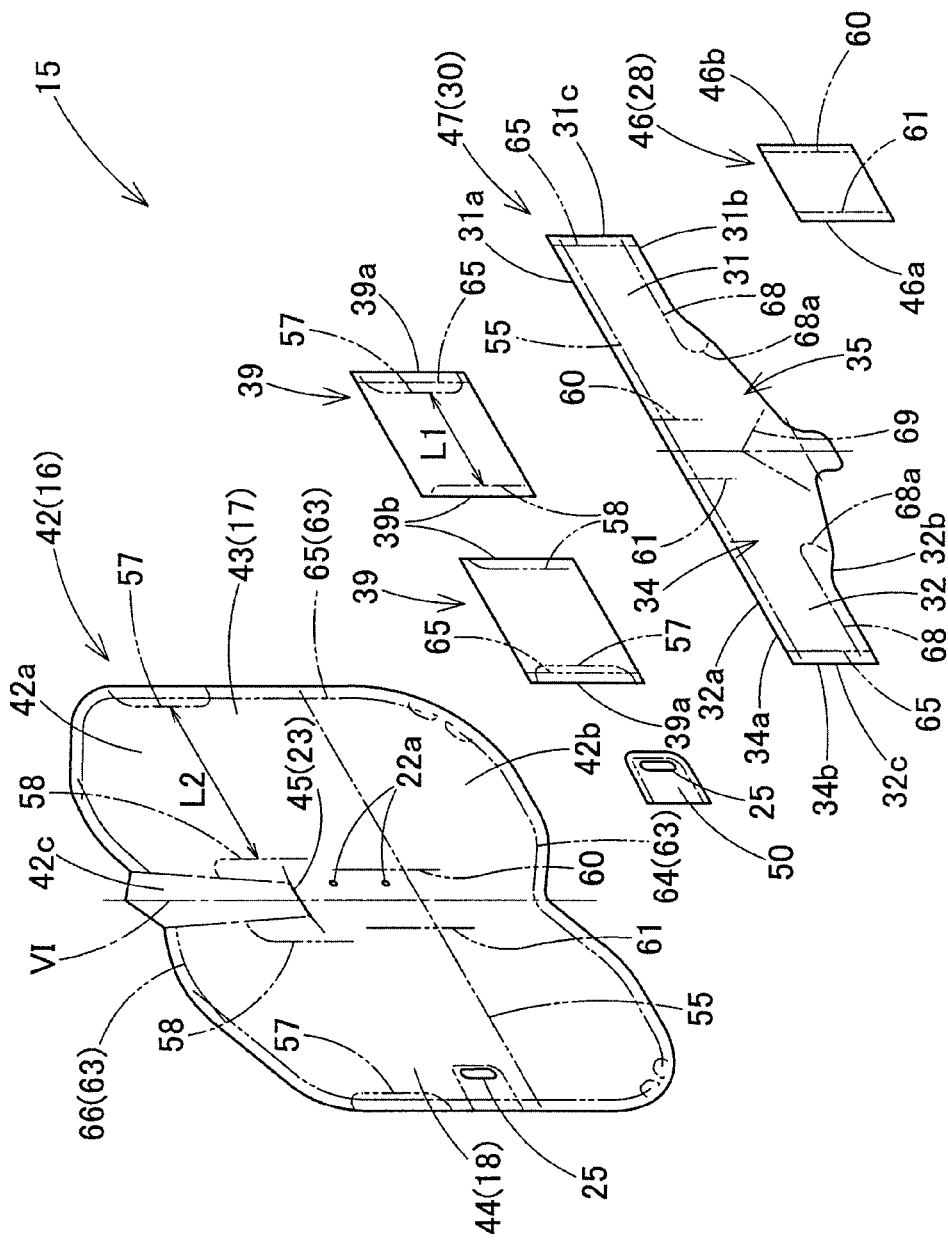
FIG. 8 is a schematic exploded perspective view of base materials that make up the airbag shown in FIG. 3.

As shown in FIGS. 3 and 23, the bag main body 16 takes a substantially elliptic plate-like shape that is wider in width towards a lower end 16b side when the bag main body 16 completes its inflation so that an occupant P sitting in the seat 1 can be protected from a chest portion B to near a hip portion H thereof. The bag main body 16 includes an inboard wall portion 17 that is disposed on the inboard side I (an occupant side) and an outboard wall portion 18 that is disposed on the outboard side O when the bag main body 16 completes its inflation. The bag main body 16 is formed into a bag-like member by joining (sewing) outer circumferential edges of the inboard wall portion 17 and the outboard wall portion 18 together. In the case of this embodiment, as shown in FIG. 8, the bag main body 16 is formed into the bag-like member by folding a main body base material 42 having a shape resulting from connecting an inboard portion 43 that constitutes the inboard wall portion 17 and an outboard portion 44 that constitutes the outboard wall portion 18 together at rear end sides thereof into two and joining (sewing) together outer circumferential edges thereof excluding rear edge sides.

Figure 7:
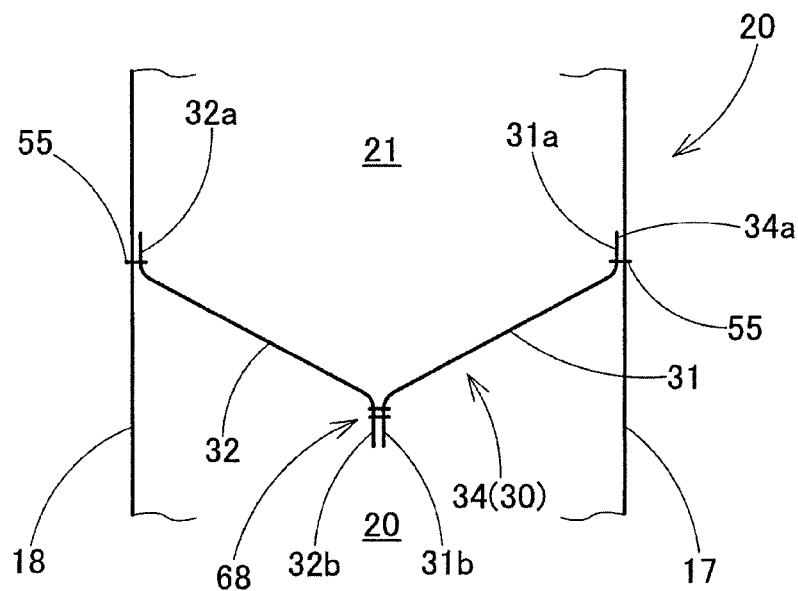
FIG. 7 is a sectional view taken along a portion VII-VII in FIG. 3.

The bag main body 16 includes, as shown in FIGS. 3 and 23, a hip protecting portion 20 that is disposed on the lower end 16b side to protect the hip portion H of the occupant P and a chest protecting portion 21 that is disposed above the hip protecting portion 20 to protect the chest portion B of the occupant P when the bag main body 16 completes its inflation. In the case of this embodiment, when the bag main body 16 completes its inflation, the hip protecting portion 20 becomes wider in a front-to-rear direction than the chest protecting portion 21 so as to protect accurately the hip portion H of the occupant P. The chest protecting portion 21 extends in the up-to-down direction so as to cover the occupant P from the chest portion B to near a shoulder portion S. In the bag main body 16 of this embodiment, the hip portion protecting portion 20 and the chest portion protecting portion 21 are divided by the dividing wall 30, as shown in FIGS. 3 and 7. In the bag main body 16 of this embodiment, bent holes 25, 26 are formed in the hip protecting portion 20 and the chest protecting portion 21 so as to allow an extra portion of the inflation gas that flows in interiors of both the protecting portions 20, 21 to be discharged therefrom. In the case of this embodiment, the vent hole 25 that is formed in the chest protecting portion 21 is formed by providing an opening in the outboard wall portion 18 at a front lower end side of the hip protecting portion 21. The vent hole 26 that is formed in the hip protecting portion 20 is formed by breaking partially the joint of a circumferential edge joint portion 63 that is formed by joining the outer circumferential edges of the inboard wall portion 17 and the outboard wall portion 18 together. In the case of this embodiment, the vent hole 26 is formed at a front lower end side of the hip protecting portion 20 that lies between a front side portion 65 and a lower side portion 64.

In the bag main body 16 of this embodiment, an area of the inboard wall portion 17 that corresponds to the vicinity of a rear lower end of the chest protecting portion 21 constitutes a mounting portion 22 where the bag main body 16 is fixed to the seat frame 3 by the inflator 10. The two mounting holes 22a, 22a are formed one above the other in the mounting portion 22 so that the mounting bolts 12b of the inflator 10 are allowed to project therefrom (refer to FIG. 8). In addition, an insertion opening 23 is formed on an upper end side of the mounting portion 22 (near a center of the chest protecting portion 21 in the up-to-down direction and on a rear end side thereof) for insertion of the inflator 10. In the case of this embodiment, the insertion opening 23 is made up of a slit 45 that is formed near a center of the main body base material 42 in a left-to-right direction so as to extend along the left-to-right direction (refer to FIG. 8). To described this in detail, in this embodiment, in forming the bag main body 16 by folding the main body base material 42 into two, an upper central portion 42c that lies above the slit 45 is folded inwards so that a fold VI is oriented inwards (refer to FIG. 3), and the slit 45 is opened by this inward fold, whereby the inflator inserting insertion opening 23 is formed.

The inner tube 28 is disposed at the portion where the mounting portion 22 is provided. In the case of this embodiment, the inner tube 28 is formed into a substantially cylindrical shape that covers an outer circumferential side of the inflator 10 including portions of the inboard wall portion 17 and the outboard wall portion 18 that lie between an inboard joint portion 60 and an outboard joint portion 61 by joining (sewing) both edges 46a, 46b of shorter sides of a substantially rectangular inner tube base material 46 to portions constituting the mounting portion 22 on the inboard wall portion 17 and the outboard wall portion 18 of the bag main body 16 where the inboard joint portion 60 and the outboard joint portion 61 are provided, respectively (refer to FIGS. 5 and 8). The inner tube 28 is configured so that the inflator 10 can be inserted thereinto. In the case of this embodiment, the inner tube 28 is sewn to the portions of the main body base material 42 where the inboard joint portion 60 and the outboard joint portion 61 are provided so that a center of the inner tube base material 46 in the left-to-right direction coincides with a center of the main body base material 42 in the left-to-right direction. The inner tube 28 is disposed so as to cover from a substantial center of the inflator 10 in the up-to-down direction to an area lying below the small-diameter portion 11b by way of the gas discharge port 11e (the small-diameter portion 11b) on the lower end side (refer to FIG. 23). The inboard joint portion 60 and the outboard joint portion 61 sewing the inner tube base material 46 to the main body base material 42 are formed so as to extend downwards by way of an upper joint portion 55, which will be described later, where the dividing wall 30 is sewn to the main body base material 42. As shown in FIG. 23, the inner tube 28 is configured so that a lower end 28a side is disposed in a position lying directly above a communicating portion 35, which will be described later, formed in the dividing wall 30. The inner tube 28 guides the inflation gas G discharged from the gas discharge port 11e that is formed at a lower end side of the inflator 10 downwards so as to cause the discharged inflation gas to flow towards the hip portion protecting portion 20.

Figure 6:
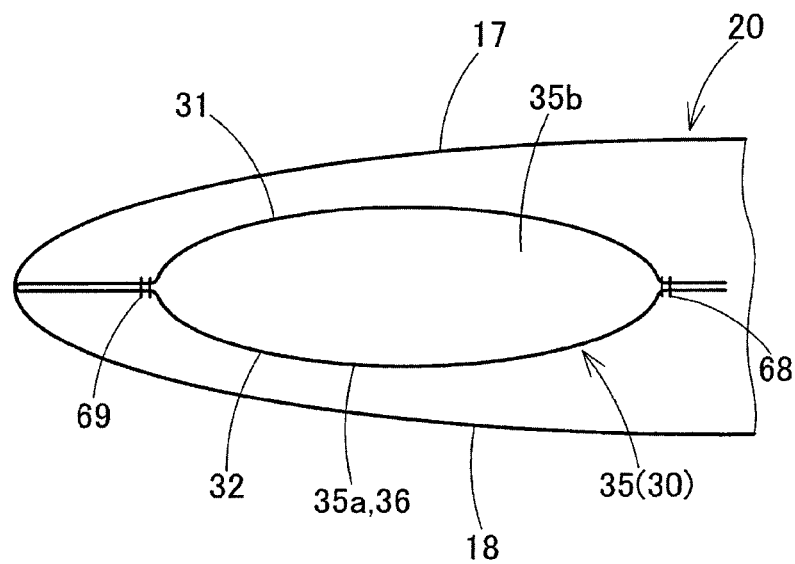
FIG. 6 is a sectional view taken along a portion VI-VI in FIG. 3.

The dividing wall 30 is provided in the bag main body 16 substantially along the front-to-rear direction so as to divide the interior of the bag main body 16 into the hip portion protecting portion 20 and the chest portion protecting portion 21. In the case of this embodiment, the dividing wall 30 includes, as shown in FIGS. 3, 6 and 7, a dividing wall main body 34 and the communicating portion 35 that establishes a communication between the hip portion protecting portion 20 and the chest portion protecting portion 21. The communicating portion 35 has a check valve 36. The dividing wall main body 34 divides the interior of the bag main body 16 into the hip portion protecting portion 20 and the chest portion protecting portion 21 by being joined (sewn) to the inboard wall portion 17 and the outboard wall portion 18 along substantially a full circumference of an outer circumferential edge 34a thereof. The communicating portion 35 is disposed on a rear end side of the bag main body 16 (in a position lying below the mounting portion 22) when the bag main body 16 completes its inflation.

To describe the dividing wall 30 in detail, the dividing wall 30 includes an inboard portion 31 that is disposed on the inboard wall portion 17 and an outboard portion 32 that is disposed on the outboard wall portion 18 (refer to FIGS. 6 and 7). The dividing wall 30 is made up of a belt-shaped dividing wall base material 47 in which the inboard portion 31 and the outboard portion 32 are connected to each other at rear end sides thereof (refer to FIG. 8). In the dividing wall 30, the inboard portion 31 and the outboard portion 32 have the same external shapes and are formed so as to be wider towards the rear end side of the bag main body 16. An upper edge 31a side of the inboard portion 31 and an upper edge 32a side of the outboard portion 32 of the dividing wall 30 are joined (sewn), respectively, to the inboard wall portion 17 and the outboard wall portion 18 at the portion where the upper joint portion 55 is provided over an overall length thereof, whereby an outer circumferential edge 34a of the dividing wall main body 34 is joined (sewn) to the inboard wall portion 17 and the outboard wall portion 18 along substantially the full circumference thereof (refer to FIGS. 3 and 7). Additionally, a front edge 34b side of the dividing wall main body 34 is joined to the bag main body 16 by sewing front edges 31c, 32c of the inboard portion 31 and the outboard portion 32 together respectively with the inboard wall portion 17 and the outboard wall portion 18 over a whole area thereof at the front side portion 65 of the circumferential edge joint portion 63 that makes up the outer circumferential edge of the bag main body 16.

A lower edge 31b side of the inboard portion 31 and a lower edge 32b side of the outboard portion 32 of the dividing wall 30 are superposed on each other and are then partially joined (sewn) together whereby the communicating portion 35 and the check valve 36 are provided at the lower edge side portions. Specifically speaking, as shown in FIGS. 3 and 23, a front side joint portion 68 that extends from a front edge side (the front side portion 65 of the circumferential edge joint portion 63) of the bag main body 16 and a rear side joint portion 69 that extends from a rear edge side of the bag main body 16 are provided at a lower edge 31b side portion of the inboard portion 31 and a lower edge 32b side portion of the outboard portion 32 that are superposed on each other, and a portion lying between the front side joint portion 68 and the rear side joint portion 69 makes up the communicating portion 35. Specifically speaking, the front side joint portion 68 is formed so as to extend from the front side portion 65 to the rear substantially along the front-to-rear direction while intersecting the front side portion 65. A distal end side of the front side joint portion 68 is then turned to be reversed in a substantially central position of the dividing wall 30 in the font-to-rear direction so that a distal end portion 68a is directed obliquely forwards and downwards. The rear side joint portion 69 is formed substantially into a straight line that extends obliquely forwards and downwards from the rear edge side of the bag main body 16. The rear side joint portion 69 extends substantially parallel to the distal end portion 68a of the front side joint portion 68 so as to define a space between the front side joint portion 68 and itself. Namely, an area between the inboard portion 31 and the outboard portion 32 that is defined by the front side joint portion 68 and the rear side joint portion 69 is formed substantially into a cylindrical shape that extends obliquely forwards and downwards while opened at both upper and lower end sides thereof. This cylindrical area makes up the communicating portion 35 that establishes the communication between the chest portion protecting portion 21 and the hip portion protecting portion 20, allowing the inflation gas G to flow into the hip portion protecting portion 20 from a lower end side opening 35b (refer to FIGS. 6 and 23). Then, portions of the inboard portion 31 and the outboard portion 32 that is disposed between the distal end portion 68a of the front side joint portion 68 and the rear joint portion 69 make up a circumferential wall 35a of the communicating portion 35. When an internal pressure in the inflating hip portion protecting portion 20 is increased as a result of the hip portion protecting portion 20 so inflating bearing the hip portion H of the occupant P, the portions of the inboard portion 31 and the outboard portion 32 that make up the circumferential wall 35a are pressed against each other to thereby close the lower end side opening 35b. Namely, this portion of the circumferential wall 35a of the communicating portion 35 makes up the check valve 36, which can restrain the inflation gas in the hip portion protecting portion 20 from flowing out into the chest portion protecting portion 21 to thereby restrain the internal pressure of the hip portion protecting portion 20 from being reduced. Owing to this configuration, the hip portion H of the occupant P can be protected accurately by the hip portion protecting portion 20 whose internal pressure is maintained as required.

The restricting pieces 39 that restrict the shape of the bag main body 16 when the bag main body 16 completes its inflation are provided in the portion of the chest portion protecting portion 21 in the bag main body 16. In the case of this embodiment, the restricting pieces 39 are disposed individually on an inboard wall portion 17 side and an outboard wall portion 18 side of the bag main body 16 constituting the chest portion protecting portion 21 so as to contract widthwise dimensions of the inboard wall portion 17 and the outboard wall portion 18 in relation to the front-to-rear direction from a state in which the inboard wall portion 17 and the outboard wall portion 18 are deployed flat (refer to FIGS. 3 and 4). The restricting pieces 39 have the same external shapes and are each formed substantially into a belt-like shape whose longitudinal direction substantially follows the front-to-rear direction. The restricting pieces 39 are disposed in a position that lies near a center of the chest portion protecting portion 21 in the up-to-down direction and apart upwards from the inner tube 28. To describe this in detail, the restricting pieces 39 are superposed on an inner circumferential surface side of the bag main body 16, and front edge 39a sides and rear edge 39b sides of the restricting pieces 39 are sewn (joined) to a front end 21a side and a rear end 21b side (of the inboard wall portion 17 and the outboard wall portion 18) of the chest portion protecting portion 21 at portions where a front side connecting portion 57 and a rear side connecting portion 58 are formed by the use of a suture or a stitching thread. In each restricting piece 39, a distance L1 defined between portions of the restricting piece 39 that is deployed flat where the front side connecting portion 57 and the rear side connecting portion 58 are planned to be formed (refer to FIG. 8) is set smaller than a distance L2 defined between portions of the main body base material 42 that is deployed flat and to which the restricting pieces 39 are not yet joined where the front side connecting portion 57 and the rear side connecting portion 58 are planned to be formed (refer to FIG. 8). In the airbag 15 that is fabricated in such a way that the restricting pieces 39 are connected to the chest portion protecting portion 21, a widthwise dimension of the chest portion protecting portion 21 in the front-to-rear direction is already contracted by the restricting pieces 39, and the chest portion protecting portion 21 is set smaller than the hip portion protecting portion 20 in relation to the widthwise dimension in the front-to-rear direction by the restricting piece 39. Then, in this embodiment, when the airbag 15 completes its inflation, the widthwise dimension of the chest portion protecting portion 21 in the front-to-rear direction is contracted with the restricting pieces 39 that are disposed in the interior of the chest portion protecting portion 21 stretched into a straight line in a section taken along the front-to-rear direction, whereby the chest portion protecting portion 21 completes its inflation to be thick by causing the inboard wall portion 17 and the outboard wall portion 18 that are restricted by the corresponding restricting pieces 39 to project outwards (refer to FIG. 4).

In this embodiment, the airbag 15 has, as shown in FIG. 8, the main body base material 42 and the inner tube base material 46 that make up the bag main body 16, the dividing wall base material 47 and the restricting pieces 39. The airbag 15 also has a reinforcement cloth 50 that reinforces a circumference of the vent hole 25 that is disposed at the front lower end side of the chest portion protecting portion 21. The main body base material 42, the inner tube base material 46, the dividing wall base material 47, the restricting pieces 39 and the reinforcement cloth 50 are each formed of flexible woven cloth of a polyester or polyamide fiber. In the bag main body 16 of the airbag 15 of the embodiment, as has been described above, the chest portion protecting portion 21 is set smaller than the hip portion protecting portion 20 in relation to the widthwise dimension in relation to the front-to-rear direction by providing the restricting portions 39. With the main body base material 42 deployed flat, an upper area 42a that makes up the chest portion protecting portion 21 has a widthwise dimension in the front-to-rear direction that is substantially the same as that of a lower area 42b that makes up the hip portion protecting portion 20, as shown in FIG. 8.

Figure 12:
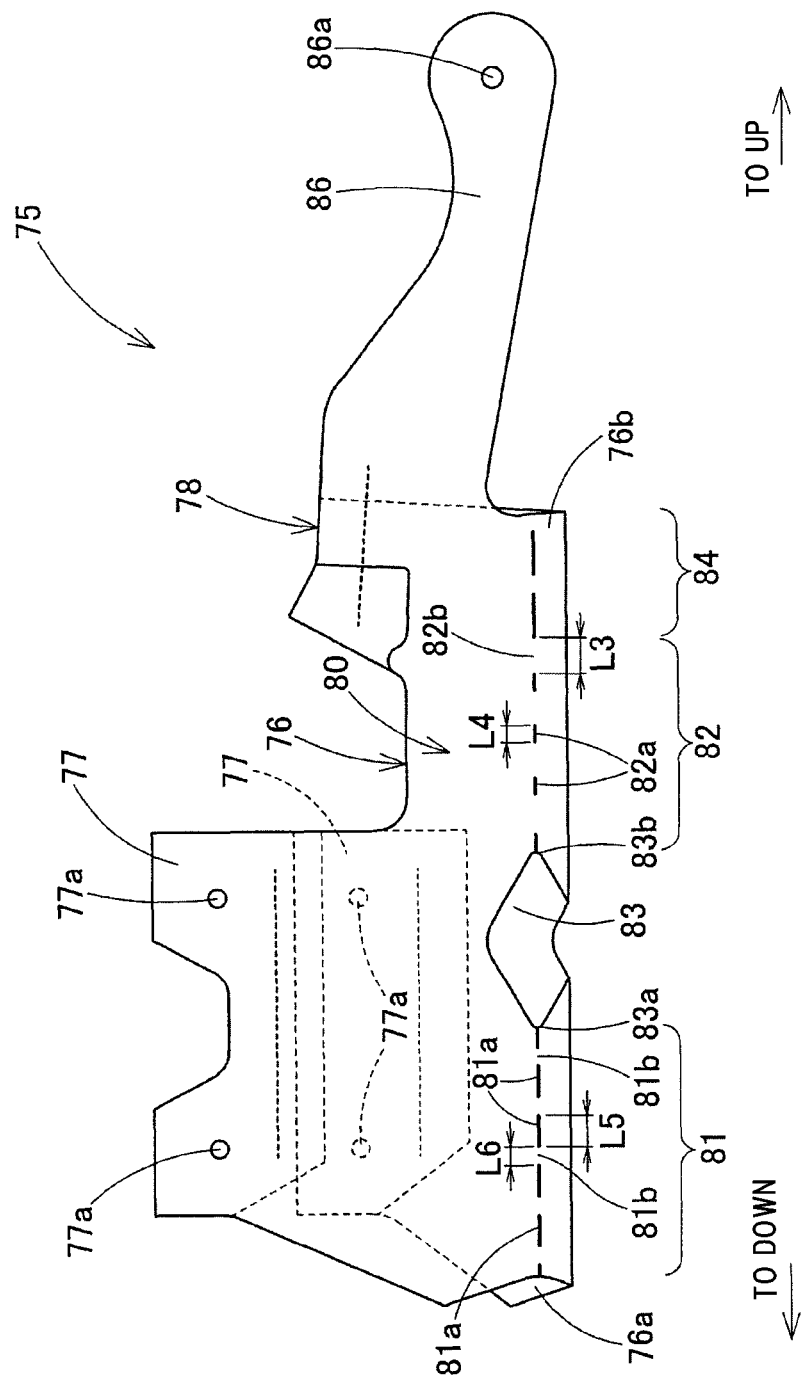
FIG. 12 is a front view of a wrapping material that is used in the side airbag system according to the embodiment.

The wrapping material 75 that wraps around the folded-up airbag body 107 that is formed by folding up the airbag 15 is formed of a flexible sheet material. The wrapping material 75 wraps around the folded-up airbag body 107 so as to prevent the collapse of neatly arranged folds of the folded-up airbag body 107. In the case of this embodiment, the wrapping material 75 is formed of a similar flexible woven cloth of a polyester or polyamide fiber to the woven cloth of which the airbag 15 is formed. As shown in Section C of FIG. 19, the wrapping material 75 is disposed so as to cover the circumference of the folded-up airbag body 107 excluding a lower end 107a side thereof. To describe this in detail, the wrapping material 75 is designed to expose a folded-over portion 108, which will be described later, disposed on the lower end 107a side of the folded-up airbag body 107. The wrapping material 75 includes, as shown in FIG. 12, a main body portion 76 that covers the circumference of the folded-up airbag body 107 and a connecting piece portion 86 that extends from the main body portion 76.

Figure 19:
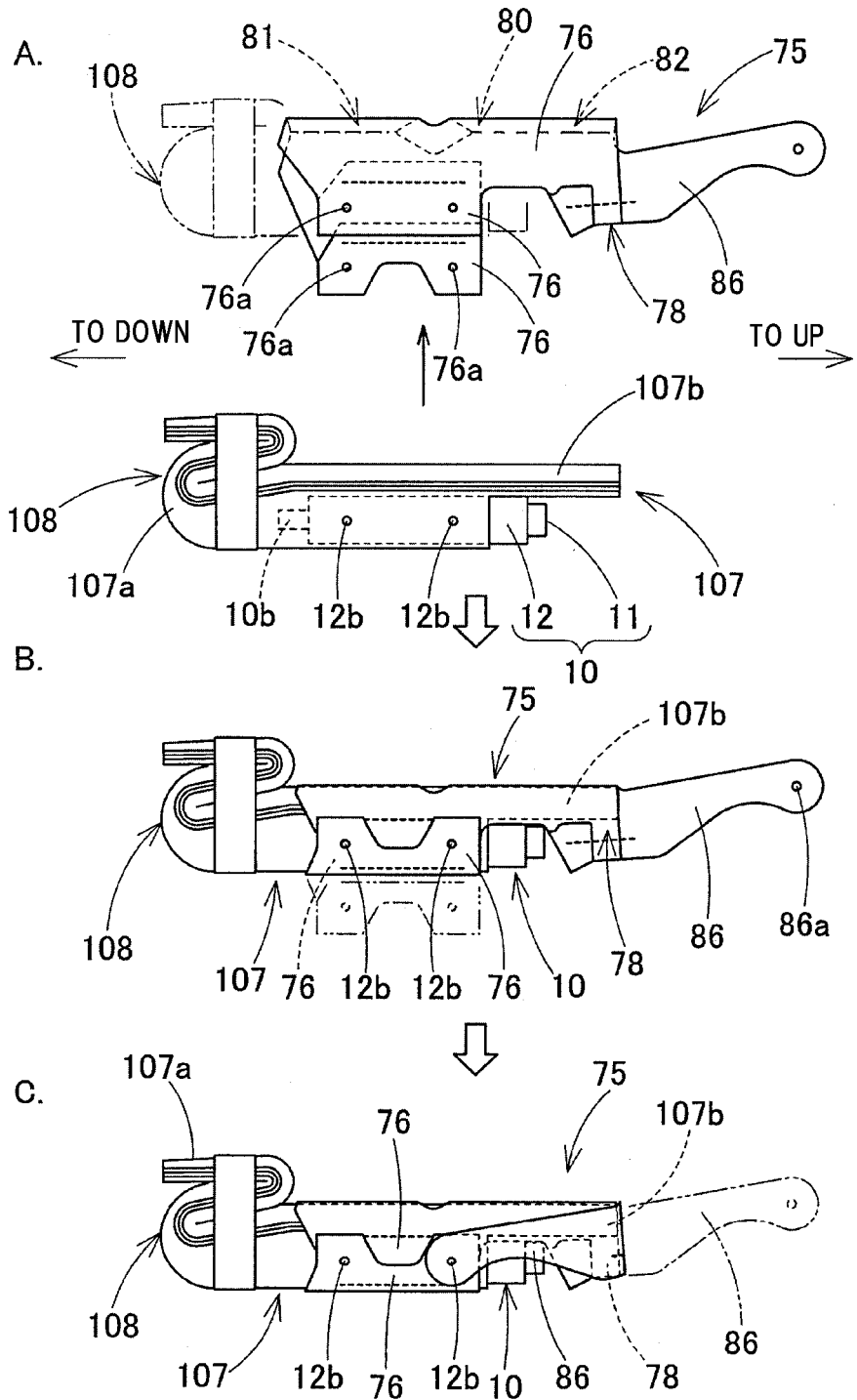
FIG. 19 is a schematic diagram explaining wrapping steps of wrapping a wrapping material around the folded-up airbag body that is formed by folding up the airbag.

As shown in Section C of FIG. 19, the main body portion 76 is designed to cover substantially a whole area of the circumference of the folded-up airbag body 107 excluding the folded-over portion 108 on the lower end 107a side of the folded-up airbag body 107. The main body portion 76 has on both edge sides mounting pieces 77, 77 that are mounted by making use of the mounting bolts 12b of the retainer 12 that project from the folded-up airbag body 107. Two mounting holes 77a, 77a are formed in each of the mounting pieces 77 so as to allow the passage of the mounting bolts 12b. In such a state that the wrapping material 75 is deployed flat, as shown in FIG. 12, the connecting piece portion 86 is formed so as to extend upwards from an upper end side of the main body portion 76. The connecting piece portion 86 has one insertion hole 86a that allows the passage of the mounting bolt 12b. This connecting piece portion 86 wraps an upper end 107b side end edge of the folded-up airbag body 107 by inserting the mounting bolt 12b through the insertion hole 86a while being turned to cover the upper end 107b side end edge of the folded-up airbag body 107 (refer to Section C of FIG. 19). In addition, in the main body portion 76, a cylindrical portion 78 is formed on an upper end side that is a connecting piece portion 86 side thereof, and this cylindrical portion 78 is partially cylindrical in shape so as to allow the insertion of the folded-up airbag body 107. The cylindrical portion 78 covers an outer circumference of the folded-up airbag body 107 that lies on the upper end 107b side thereof. The cylindrical portion 78 is formed to make simple wrapping work of the wrapping material 75 by inserting the upper end 107b side of the folded-up airbag body 107 into the cylindrical portion 78 in wrapping the wrapping material 75 around the folded-up airbag body 107.

Figure 17:
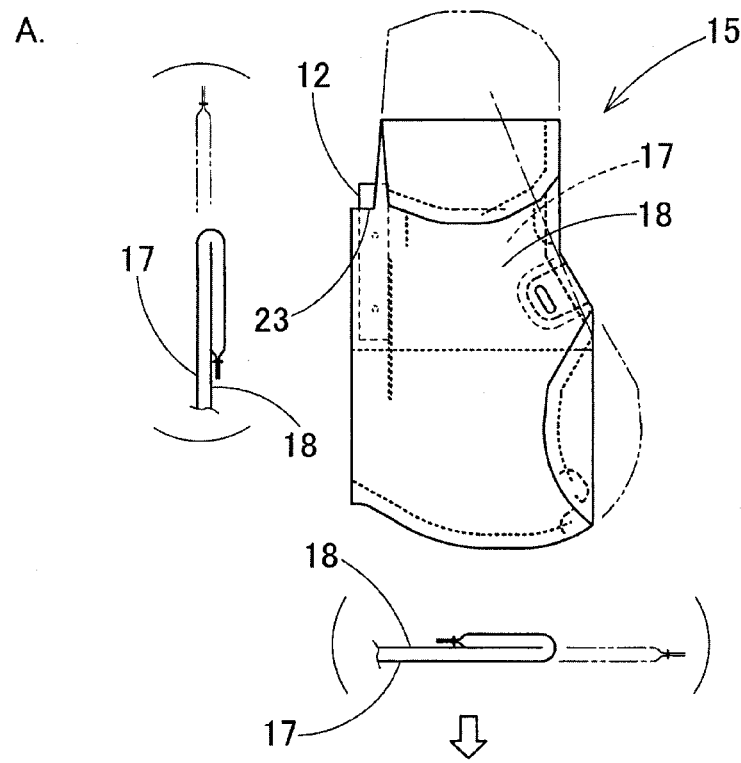
FIG. 17 is a schematic diagram explaining folding steps of folding up the airbag of the embodiment.
Figure 17:
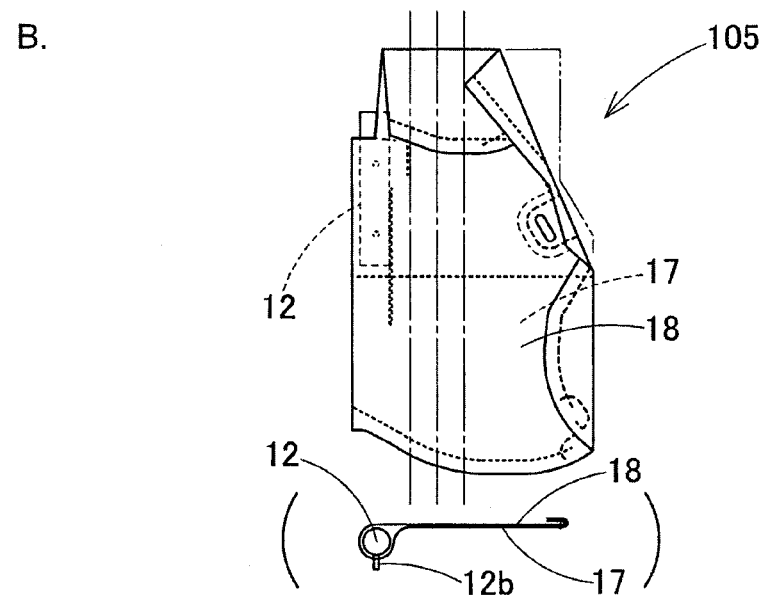

In this embodiment, the airbag 15 is folded so that the folded-up airbag body 107 is formed by folding an area below the inflator 10 (the retainer 12) to form the folded-over portion 108 (refer to FIGS. 17 and 18). Namely, in this embodiment, the airbag 15 is folded so that the folded-over portion 108 is formed by folding the hip portion protecting portion 20 that is made up of the area of the airbag 15 that lies below the inflator 10 (the retainer 12). Then, in the folded-up airbag body 107, the wrapping material 75 is provided to cover an outer circumferential side of the portion on the upper end 107b side where the chest portion protecting portion 21 is provided while exposing the portion on the lower end 107a side constituting at least one end side in the up-to-down direction where the hip portion protecting portion 20 is provided (refer to Section C of FIG. 19).

In the main body portion 76, a break planned portion 80 is provided so as to substantially follow the up-to-down direction in a position lying on a front surface side of the folded-up airbag body 107 (refer to FIG. 12), and this break planned portion 80 can break when the airbag 15 inflates. To describe this in detail, the break planned portion 80 is disposed substantially in a center of a front surface of the folded-up airbag body 107 with the side airbag system 1 mounted on the vehicle. With a wrapping base material 89, which will be described later, making up the wrapping material 75 deployed flat, the break planned portion 80 is disposed in a position that is offset slightly further inwards (leftwards in the case of this embodiment) than a center of the main body portion 76 in the left-to-right direction (an inboard-to-outboard direction of the vehicle) (refer to Section A of FIG. 13). In addition, the break planned portion 80 is formed so as to extend over a whole area of the main body portion 76 in relation to the up-to-down direction.

As shown in FIG. 12, the break planned portion 80 includes a low-strength portion 81 whose break strength is set low, a high-strength portion 82 whose break strength is set high, and an opening portion 83 that is disposed between the low-strength portion 81 and the high-strength portion 82. The opening portion 83 constitutes an originating point of break of the low-strength portion 81 and the high-strength portion 82. In the case of this embodiment, the opening portion 83 is formed in a position that is offset slightly further downwards than a center of the main body portion 76 in the up-to-down direction and has a substantially diamond-like external shape with a major axis substantially following the up-to-down direction (refer to Section A of FIG. 13). The low-strength portion 81 and the high-strength portion 82 continue respectively to a lower end apex 83a and an upper end apex 83b of the diamond-like shape. To describe this in detail, in cuts 81a, 82a, which will be described later, making up the low-strength portion 81 and the high-strength portion 82, respectively, cuts disposed on sides of the opening portion 83 continue to the opening portion 83. In this embodiment, the opening portion 83 has the substantially diamond-like shape with the major axis substantially following the up-to-down direction, and lower and upper corners of the diamond-like opening portion 83 which continue respectively to the low-strength portion 81 and the high-strength portion 82 form opposite acute angles. Therefore, stress tends to easily concentrate at the apexes 83a, 83b of the acute angled portions, whereby the low-strength portion 81 and the high-strength portion 82 can be caused to start breaking smoothly from these apexes 83a, 83b as originating points.

In the case of this embodiment, the low-strength portion 81 and the high-strength portion 82 are formed by making broken slit-shaped cuts 81a, 82a to the main body portion, and the break strengths of the low-strength portion 81 and the high-strength portion 82 are controlled by changing lengthwise dimensions of the cuts 81a, 82a and spacing distances of the cuts 81a and the cuts 82a (widthwise dimensions of inter-cut portions 81b, 82b). In the low-strength portion 81, the break strength is set low by setting the cuts 81a long and the widthwise dimension of the inter-cut portions 81b small. In the high-strength portion 82, the break strength is set higher than that of the low-strength portion 81 by setting the cuts 82a shorter than the cuts 81a and the widthwise dimension of the inter-cut portions 82b greater than that of the inter-cut portions 81b of the low-strength portion 81. To describe this in detail, in this embodiment, as shown in FIG. 12, in the high-strength portion 82, a widthwise dimension L3 of the inter-cut portion 82b is greater than a lengthwise dimension L4 of the cut 82a so as to be on the order of one and a half times the lengthwise dimension L4 of the cut 82a. In the low-strength portion 81, a lengthwise dimension L5 of the cut 81a is set so great as to be on the order of two times the lengthwise dimension L4 of the cut 82a in the high-strength portion 82. Then, a widthwise dimension L6 of the inter-cut portion 81b is set so small as to be on the order of half the lengthwise dimension L5 of the cut 81a.

In the case of this embodiment, the low-strength portion 81 is formed in the area lying from a lower side of the opening portion 83 towards a lower edge 76a side of the main body portion 76. Namely, the low-strength portion 81 is provided closer to the folded-over portion 108 that lies on the lower end 107a sides of the folded-up airbag body 107 to be exposed from the main body portion 76 (refer to Section A of FIG. 19). The high-strength portion 82 is formed in the area above the opening portion 83. To be specific, the high-strength portion 82 is formed only in the area of the main body portion 76 excluding the cylindrical portion 78 (the area between the opening portion 83 and the cylindrical portion 78). As shown in FIG. 12, a general breakable portion 84 is formed in the area where the cylindrical portion 78 is provided so as to continue to the high-strength portion 82 at one end and to almost reach an upper edge 76b side of the main body portion 76. The general breakable portion 84 is given a break strength that is set lower than that of the low-strength portion 81 by making cuts whose lengthwise dimension is greater than that of the cuts 81a in the low-strength portion 81, so that the portion where the cylindrical portion 78 is provided can be broken by propagating a break from the high-strength portion 82 quickly.

In this embodiment, the low-strength portion 81 and the high-strength portion 82 start breaking individually from the sides facing the opening portion 83 that functions as the originating point of break in an initial stage of inflation of the airbag 15. Then, when the break is propagated thereto from the high-strength portion 82, the general breakable portion 84 disposed above the high-strength portion 82 is broken, whereby the main body portion 76 is broken on inboard and outboard sides thereof excluding the portion where the cylindrical portion 78 is provided. In the case of this embodiment, since a cutout portion is provided in a portion on the lower edge 76a side of the main body portion 76, the low-strength portion 81 is designed to employ also this portion on the lower edge 76a side of the main body portion 76 as an originating point of break, so that breaks can be propagated quickly from both the upper and lower sides thereof, whereby a whole area of the low-strength portion 81 can be broken quickly.

Figure 13:
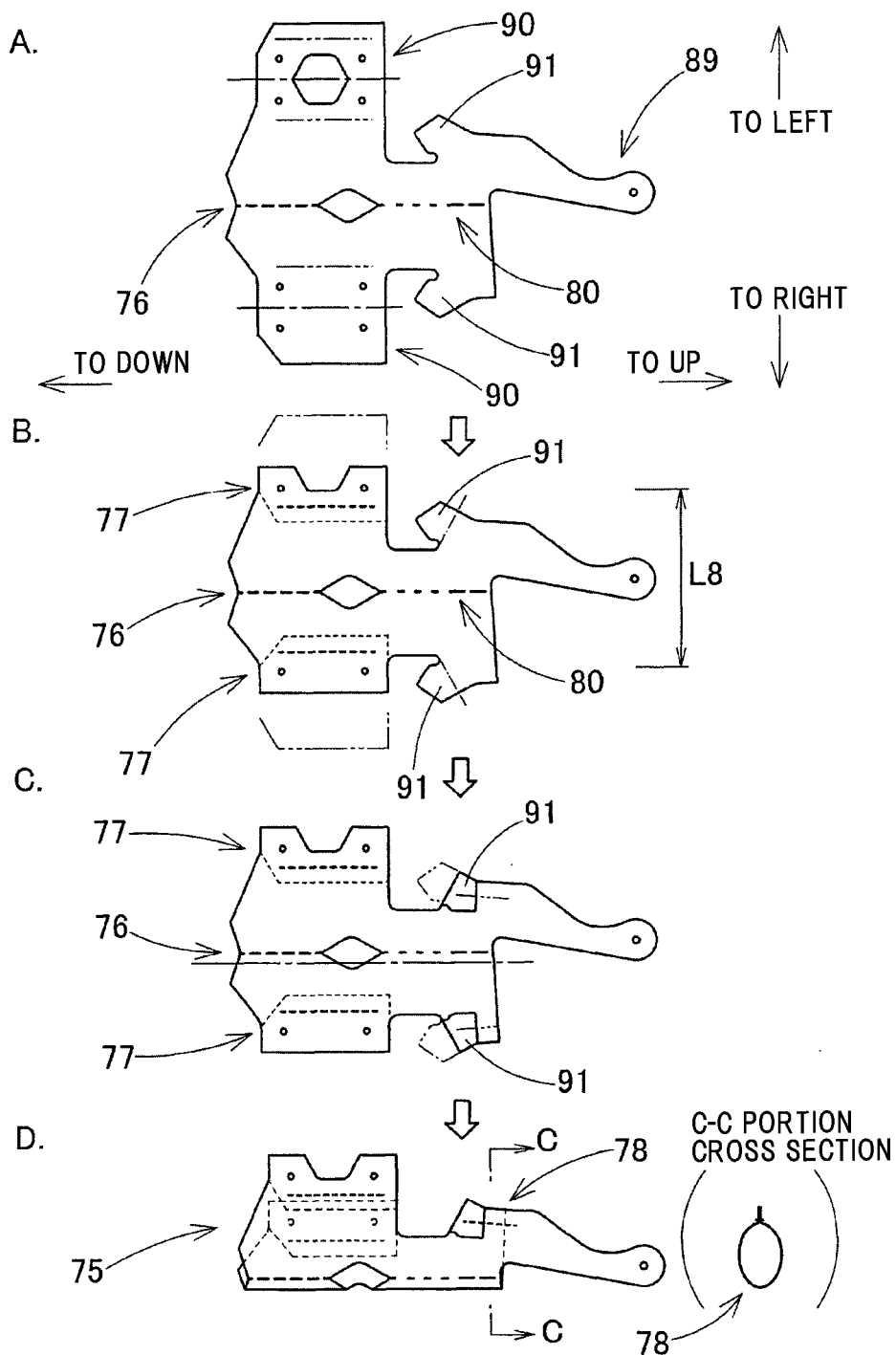
FIG. 13 is a schematic diagram explaining fabrication steps of a fabrication process of fabricating the wrapping material shown in FIG. 12.

The wrapping material 75 is made up of the wrapping base material 89 shown in Section A of FIG. 13. The wrapping base material 89 includes mounting piece make-up portions 90 that make up mounting pieces 77. Each mounting piece make-up portion is designed to form a double-layered mounting piece 77 in which two mounting piece make-up members are superposed on each other. Additionally, the wrapping base material 89 also includes reinforcement portions 91 that reinforce a lower end side of the cylindrical portion 78. In the embodiment, the mounting piece make-up portions 90 of the wrapping base material 89 are each folded so that the two mounting piece make-up members are folded over each other, and end edges of the mounting piece make-up members so folded are sewn together by the use of a suture to form a mounting piece 77 (refer to Section B of FIG. 13). The whole of the wrapping base material 89 is folded into two so that an external shape of a portion that makes up the cylindrical portion coincides with that of the folded-up airbag body 107 with the reinforcement portions 91 folded (refer to Section C of FIG. 13). Then, end edge sides of the wrapping base material 89 so folded are sewn together including the reinforcement portion 91 by the use of a suture to form the cylindrical portion 78, whereby the wrapping material 75 can be formed as shown in Section D of FIG. 13.

The restraint member 95 that is disposed around the outer circumference of the folded-up airbag body 107 that is covered around the outer circumference thereof by the wrapping material 75 is configured as a belt-shaped body that is made up of a flexible sheet material. In the case of the embodiment, the restraint member 95 is formed of a similar flexible woven cloth of a polyester or polyamide fiber to the woven cloth of which the airbag 15 and the wrapping material 75 are formed.

Figure 14:
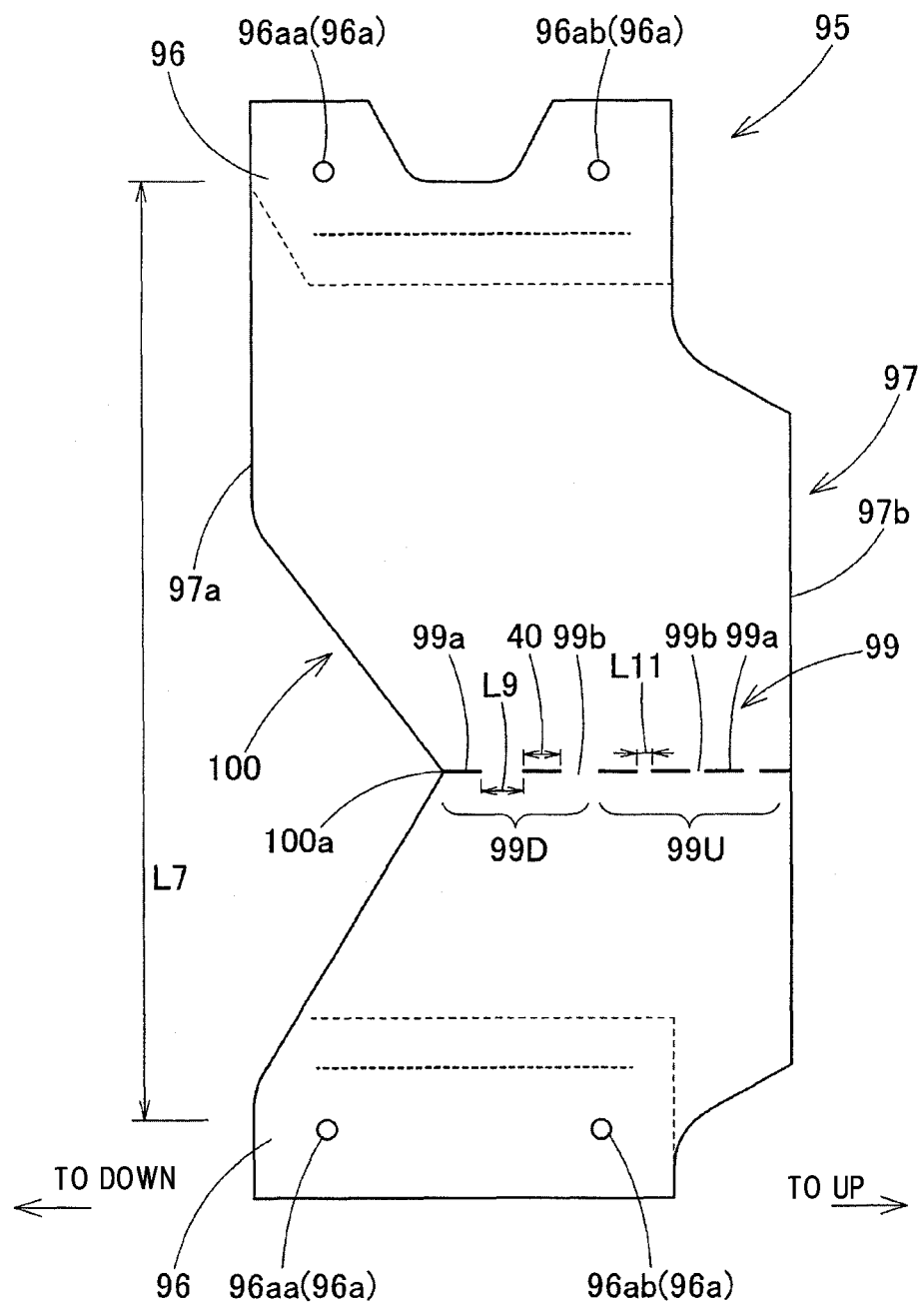
FIG. 14 is a plan view of a restraint member, deployed flat, which is used in the side airbag system according to the embodiment.

The restraint member 95 is made of the flexible sheet material and is configured substantially as the belt-shaped body adapted to be disposed around the circumference of the folded-up airbag body 107 as shown in FIG. 14. The restraint member 95 includes connecting portions 96 that are provided at both end sides thereof. The restraint member 95 is disposed around the circumference of the folded-up airbag body 107 by the connecting portions 96 provided at both the end sides being connected to the folded-up airbag body 107. A portion defined between the connecting portions 96 is configured as a loose portion 97 that is disposed apart from the folded-up airbag body 107. Specifically speaking, insertion holes 96a, 96a are provided on each of the connecting portions 96 that are disposed at both the end sides of the restraint member 95 for insertion of the mounting bolts 12b of the retainer 12. In the case of this embodiment, the restraint member 95 is disposed around the folded-up airbag body 107 that is covered around the circumference by the wrapping material 75 so as to cover an outer circumferential side of the area of the wrapping material 75 where the main body portion 76 is provided (refer to FIG. 2 and Section E of FIG. 20). To describe this in greater detail, the restraint member 95 is disposed so as to cover an outer circumferential side of an area on the main body portion 76 of the wrapping material 75 that lies on a lower side of the cylindrical portion 78 (refer to Section E of FIG. 20).

In the restraint member 95, a lengthwise dimension of the loose portion 97 (a lengthwise dimension of the portion between the connecting portions 96, and in other words, a spacing distance L7 between the insertion holes 96a, 96a, refer to FIG. 14) is set longer than a circumferential length of the folded-up airbag body 107. To describe this in detail, in the case of this embodiment, the lengthwise dimension of the loose portion 97 is set longer than an outer circumferential length of a portion of the folded-up airbag body 107 that corresponds to the main body portion 76 of the wrapping material 75 that is wound around the circumference of the folded-up airbag body 107. Additionally, in the airbag 15 when its inflation has completed, the lengthwise dimension of the loose portion 97 is set shorter than a length of an airbag make-up piece that makes up a lower side area of the chest portion protecting portion 21 that corresponds to the loose portion 97. Specifically, in the case of this embodiment, the lengthwise dimension of the loose portion 97 (the spacing distance L7 between the insertion holes 96a, 96a) is set greater than a lengthwise dimension of the main body portion 76 of the wrapping material 75 (a spacing distance L8 between mounting holes 77a, 77a that are formed in the mounting pieces 77, refer to Section B of FIG. 13). Additionally, the lengthwise dimension of the loose portion 97 (the spacing distance L7 between the insertion holes 96a, 96a) is set smaller than a value that is twice as great as a widthwise dimension L12 (refer to FIG. 3) of the lower side area of the chest portion protecting portion 21 (the area below the restricting pieces 39) in the front-to-rear direction with the airbag 15 deployed flat.

The loose portion 97 includes a break planned portion 99 that can be broken so as to divide the portion between the connecting portions 96 when the airbag 15 inflates in an area lying on a side where the folded-up airbag body 107 projects to the front. Specifically speaking, when the airbag 15 inflates as the inflation gas fills it to press open the portion of the restraint member 95 where the loose portion 97 is provided in the initial stage of inflation of the airbag 15, the break planned portion 99 is disposed in a position on a front surface side of the airbag 15 that is situated substantially at a center in the left-to-right direction. With the restraint member 95 deployed flat, the break planned portion 99 is disposed in a position that is offset slightly further outwards (rightwards in the case of this embodiment) than a center of the loose portion 97 in the left-to-right direction (the inboard-to-outboard direction of the vehicle).

Figure 20:
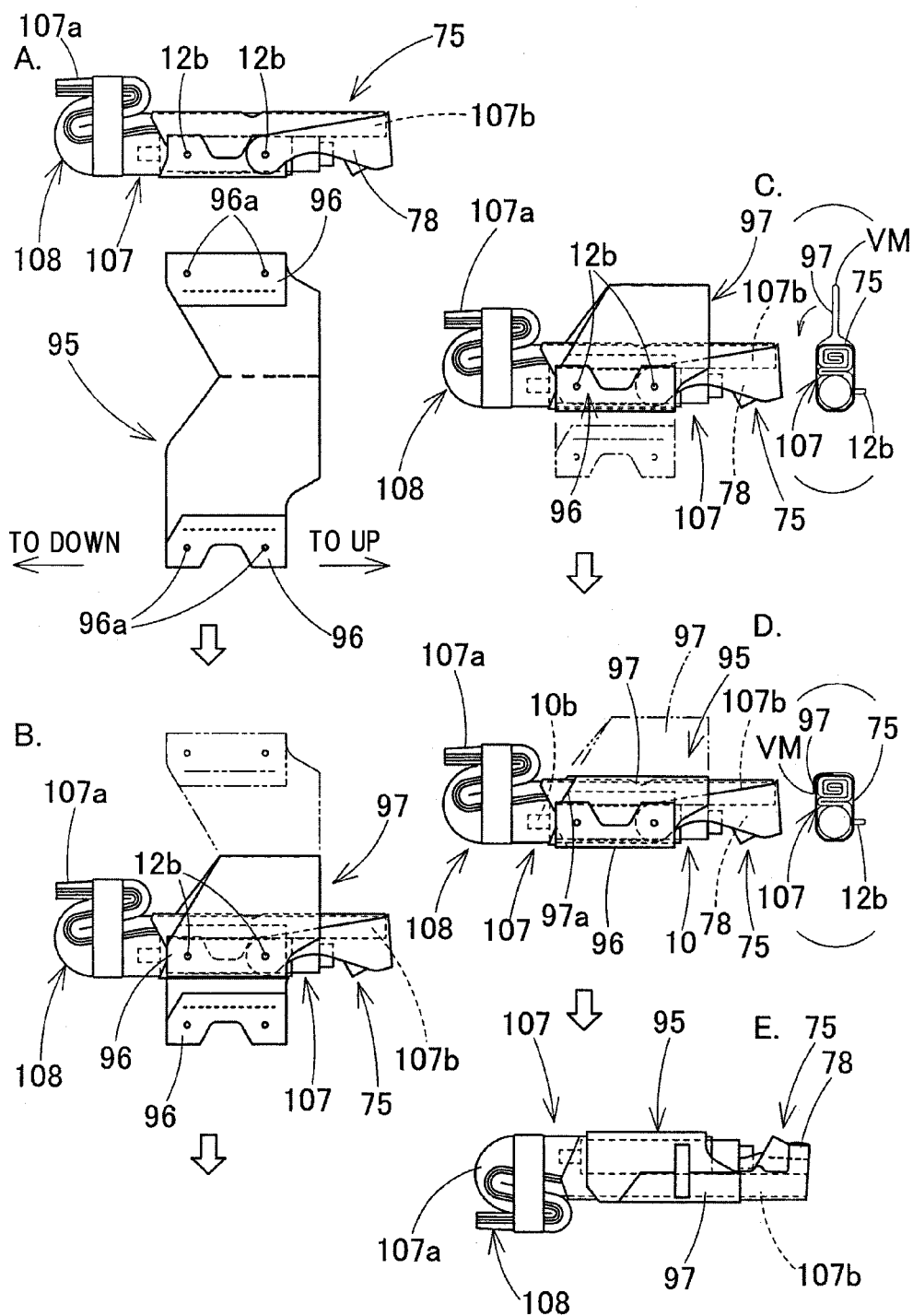
FIG. 20 is a schematic diagram explaining disposing steps of disposing the restraint member around the folded-up airbag body around which the wrapping material is wound.

A lower edge 97a side of the loose portion 97 is disposed near a front side of the gas discharge port 11e (the small-diameter portion 11b) of the inflator 10 (refer to Section D of FIG. 20). A cutout portion 100 is formed on the lower edge 97a side of the loose portion 97. With the restraint member 95 deployed flat, as shown in FIG. 14, this cutout portion 100 is cut out into a tapering shape in such a way that a width gets narrower towards a break planned portion 99 side thereof (the center in the left-to-right direction (the inboard-to-outboard direction). In the case of this embodiment, the cutout portion 100 is configured so that an apex 100a thereof is positioned upwards of the insertion holes 96aa that are disposed on lower sides of the connecting portions 96, and the break planned portion 99 is formed so as to extend upwards from this apex 100a. Then, this cutout portion 100 constitutes an originating portion constituting, in turn, an originating point where the break planned portion 99 starts breaking. To describe this in detail, in cuts 99a that make up the break planned portion 99, one disposed on a lower end side continues to the cutout portion 100.

Figure 24:
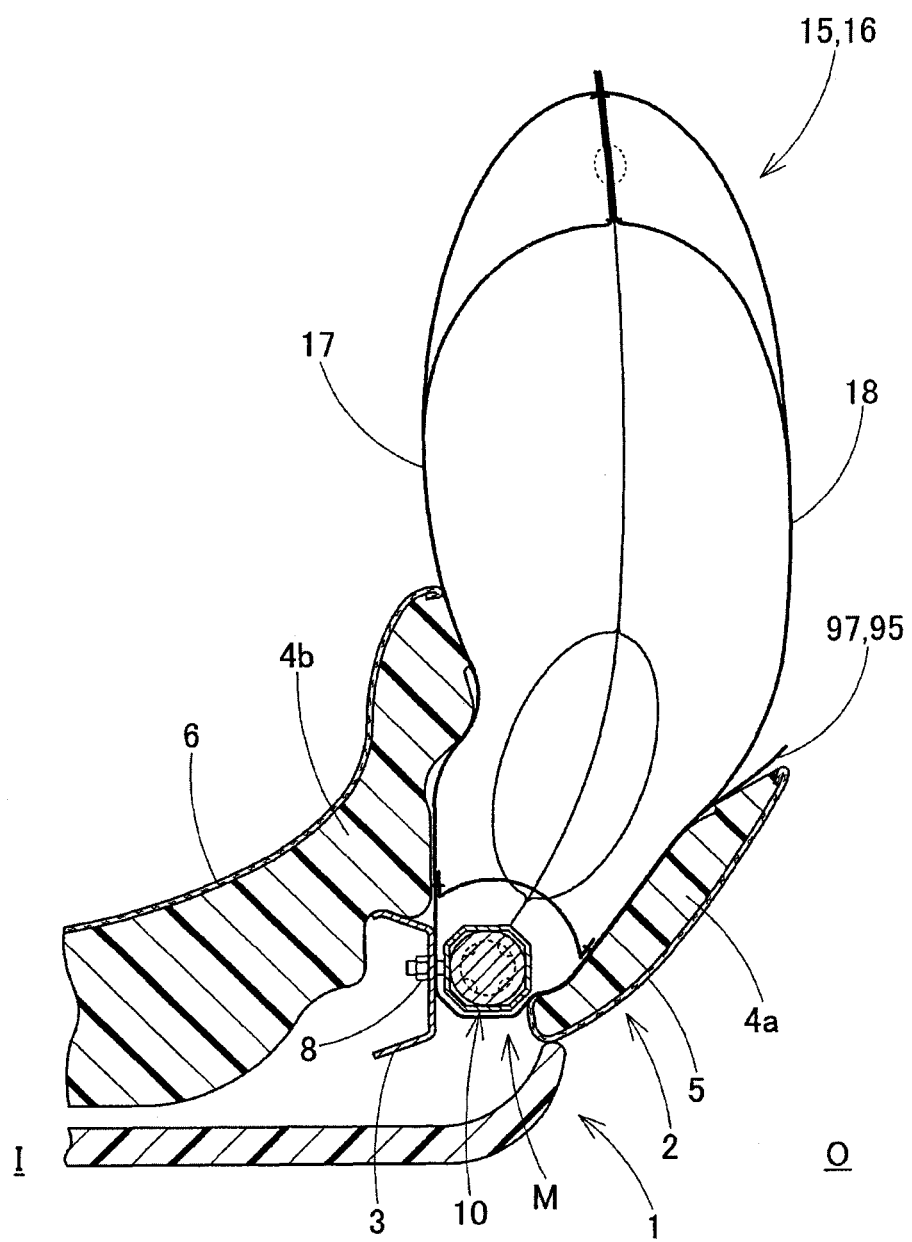
FIG. 24 is a schematic cross-sectional view of the side airbag system of the embodiment, showing a state in which the airbag completes its inflation.

The break planned portion 99 is provided to extend upwards from the cutout portion 100 substantially along the up-to-down direction so as to extend over a whole area of the loose portion 97 in the up-to-down direction, so that the portion between the connecting portions 96, 96 can be broken when the airbag 15 inflates (refer to FIG. 24). In the case of this embodiment, the break planned portion 99 is made by making broken slit-shaped cuts 99a in the loose portion 97. To describe this in detail, the break planned portion 99 provided on the loose portion 97 includes a plurality of broken cuts 99a having a constant lengthwise dimension. Then, a spacing distance between the cuts 99a becomes greater in a lower area that lies closer to the cutout portion 100, while the spacing distance becomes smaller in an upper area that lies away from the cutout portion 100. Specifically speaking, in a lower portion 99D of the brake planned portion 99 that lies below the upper through holes 96ab, a spacing distance L9 between the cuts 99a (a widthwise dimension of an inter-cut portion 99b) is set substantially the same as a lengthwise dimension L10 of the cut 99a, while in an upper portion 99U that lies above the upper through holes 96ab, a widthwise dimension L11 of the inter-cut portion 99b is set on the order of half the lengthwise dimension L10 of the cut 99a. Namely, in this embodiment, the break planned portion 99 is configured so that a break strength thereof is set high at the lower portion 99D that is the area lying on the side (the lower side) that faces the cutout portion 100 constituting the originating side of break, while the break strength is set low at the upper portion 99U to which the break is propagated.

Figure 16:
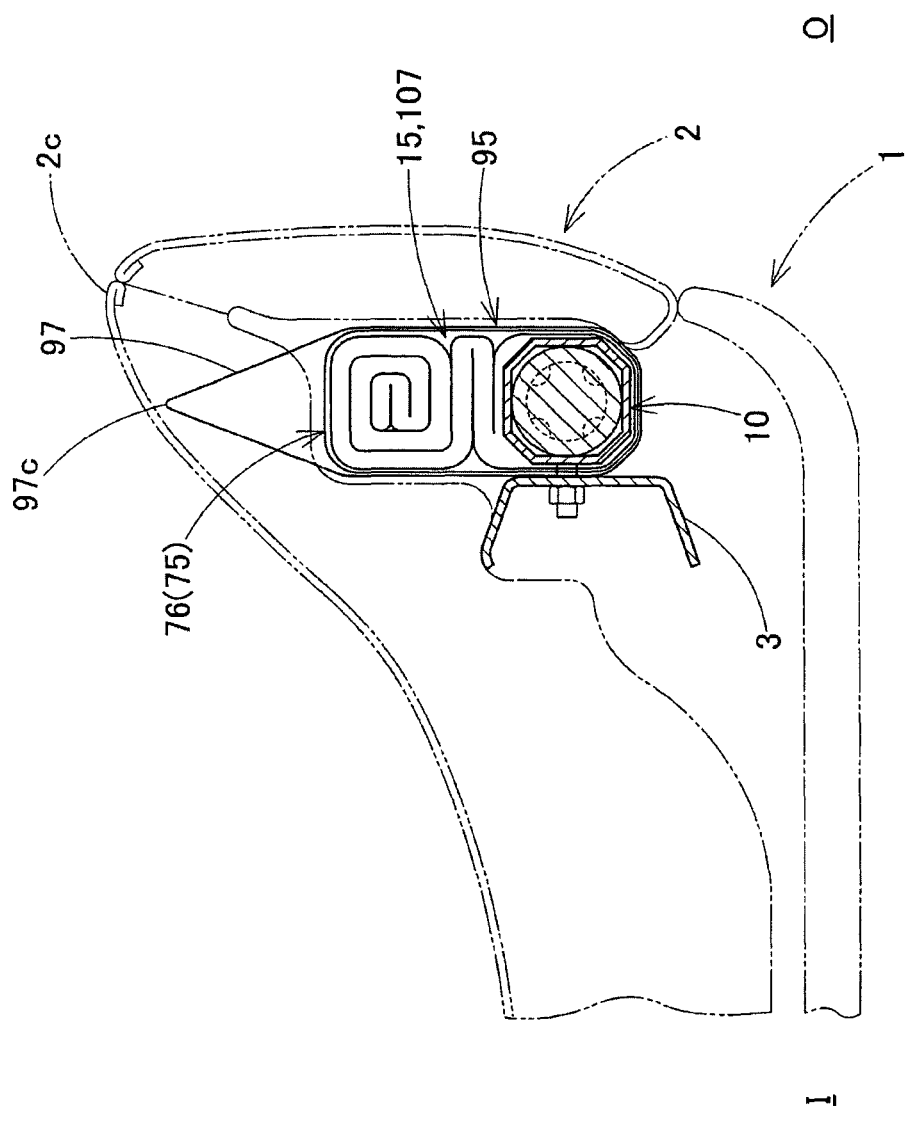
FIG. 16 is a schematic sectional view of the side airbag system of the embodiment with only a folded-up airbag body that is formed by folding up the airbag and the restraint member shown as being mounted on the vehicle in such a state that a loose portion of the restraint member that is disposed around the folded-up airbag body is left extended to the front.
Figure 21:
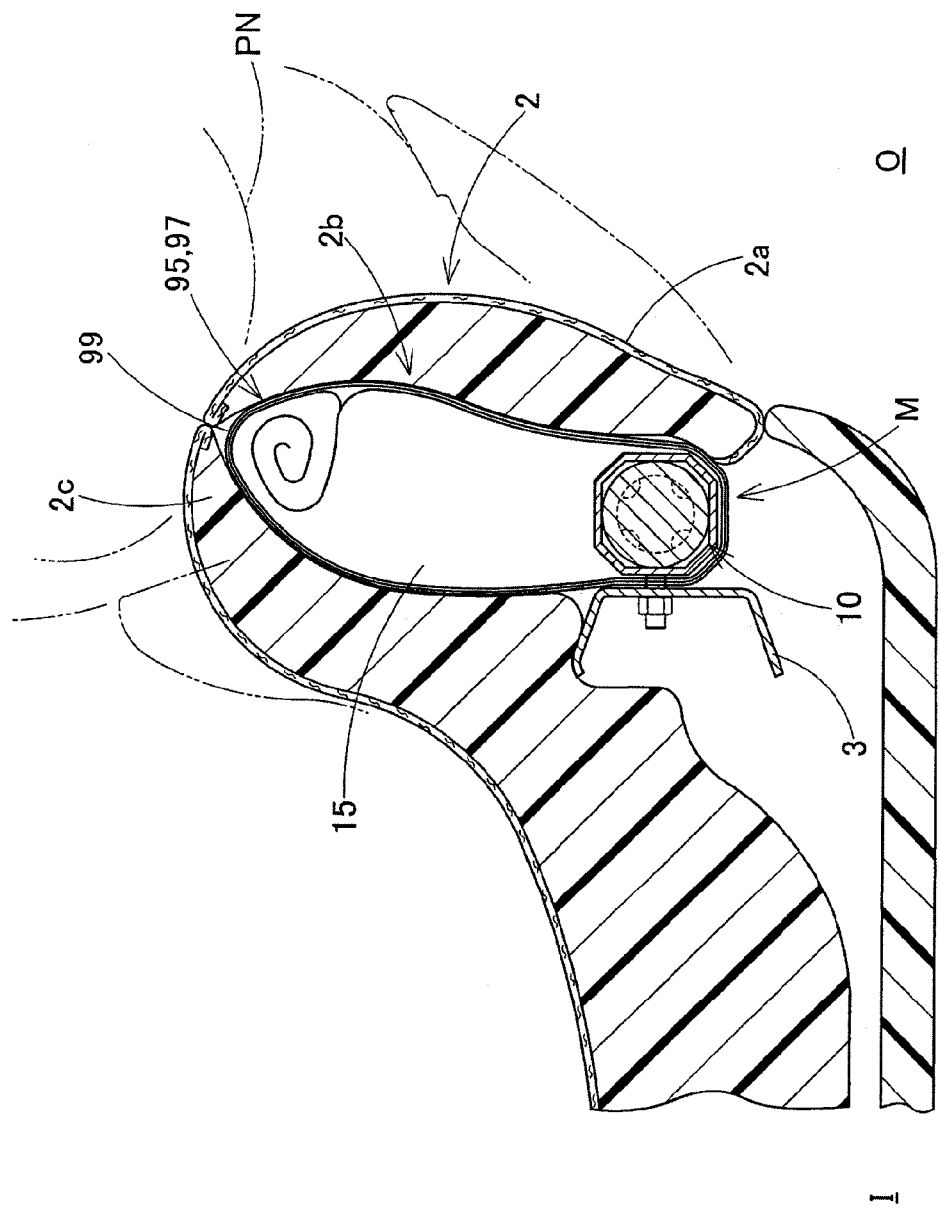
FIG. 21 is a schematic cross-sectional view of the side airbag system of the embodiment showing a state in front of a break planned portion of the restraint member in an initial stage of inflation of the airbag.

In this embodiment, the lengthwise dimension of the loose portion 97 of the restraint member 95 (the spacing distance L7 between the insertion holes 96a, 96a) is set to such a dimension that allows an apex 97c of the loose portion 97 that results when the loose portion 97 is extended to the front to be disposed in a position that corresponds to the vicinity of a front end 2c of the seatback 2 in a cross section as shown in FIG. 16 that is taken substantially along the front-to-rear direction, showing the side airbag system 1 with only the folded-up airbag body 107 and the restraint member 95 shown as being mounted on the vehicle. Then, the break planned portion 99 that is formed on the loose portion 97 is positioned in an interior of the seatback 2 before the break planned portion 99 breaks in the initial stage of inflation of the airbag 15 (refer to FIG. 21). In the case of this embodiment, the restraint member 95 is disposed when it is mounted on the vehicle so that the loose portion 97 is wound around the circumference of the folded-up airbag body 107 from the state where the loose portion 97 is folded over itself so that one part thereof is superposed on another while maintaining the superposed state. In other words, with the restraint member 95 disposed around the circumference of the folded-up airbag body 107, the loose portion 97 is wound around the circumference of the folded-up airbag body 107 in such a state that the loose portion 97 is folded over itself along a ridge-like fold VM so that one part of it is superposed on another (refer to FIGS. 2 and 20). In the case of this embodiment, the loose portion 97 is wound around the circumference of the folded-up airbag body 107 towards the outboard side O, as shown in FIG. 2.

Figure 15:
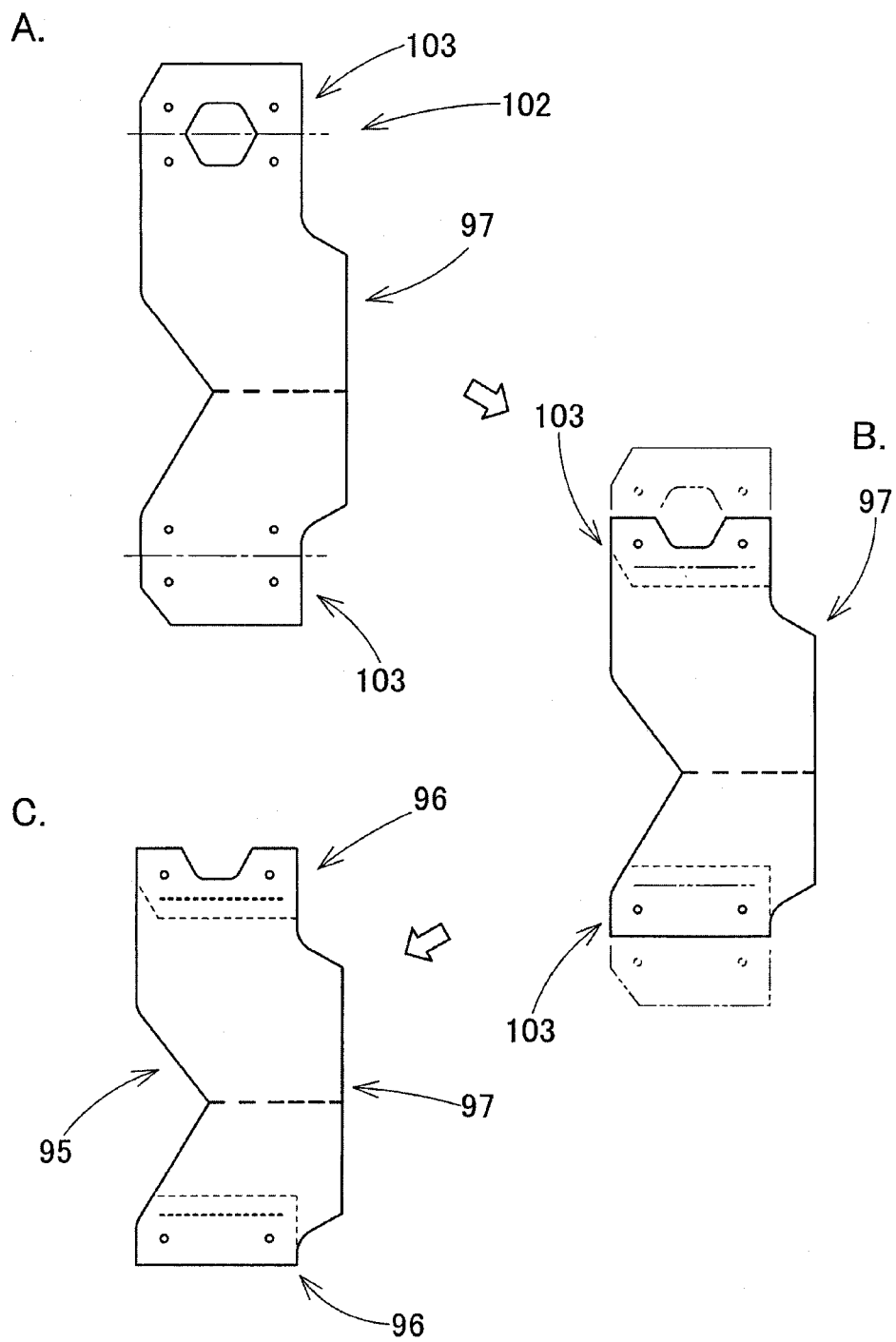
FIG. 15 is a schematic diagram explaining fabrication steps of a fabrication process of fabricating the restraint member shown in FIG. 14.

The restraint member 95 is made up of a restraint member base material 102 shown in Section A of FIG. 15. In the restraint member base material 102, connecting portion make-up portions 103 that make up the connecting portions 96 are each designed to form a double-layered connecting portion 96 in which two connecting portion make-up members are superposed on each other. In this embodiment, as shown in Sections B and C of FIG. 15, the restraint member 95 is formed by folding the connecting portion make-up portions 103 of the restraint member base material 102 into two and sewing together end edge sides of the connecting portion make-up portions 103 so folded by the use of a suture to form connecting portions 96.

Figure 9:
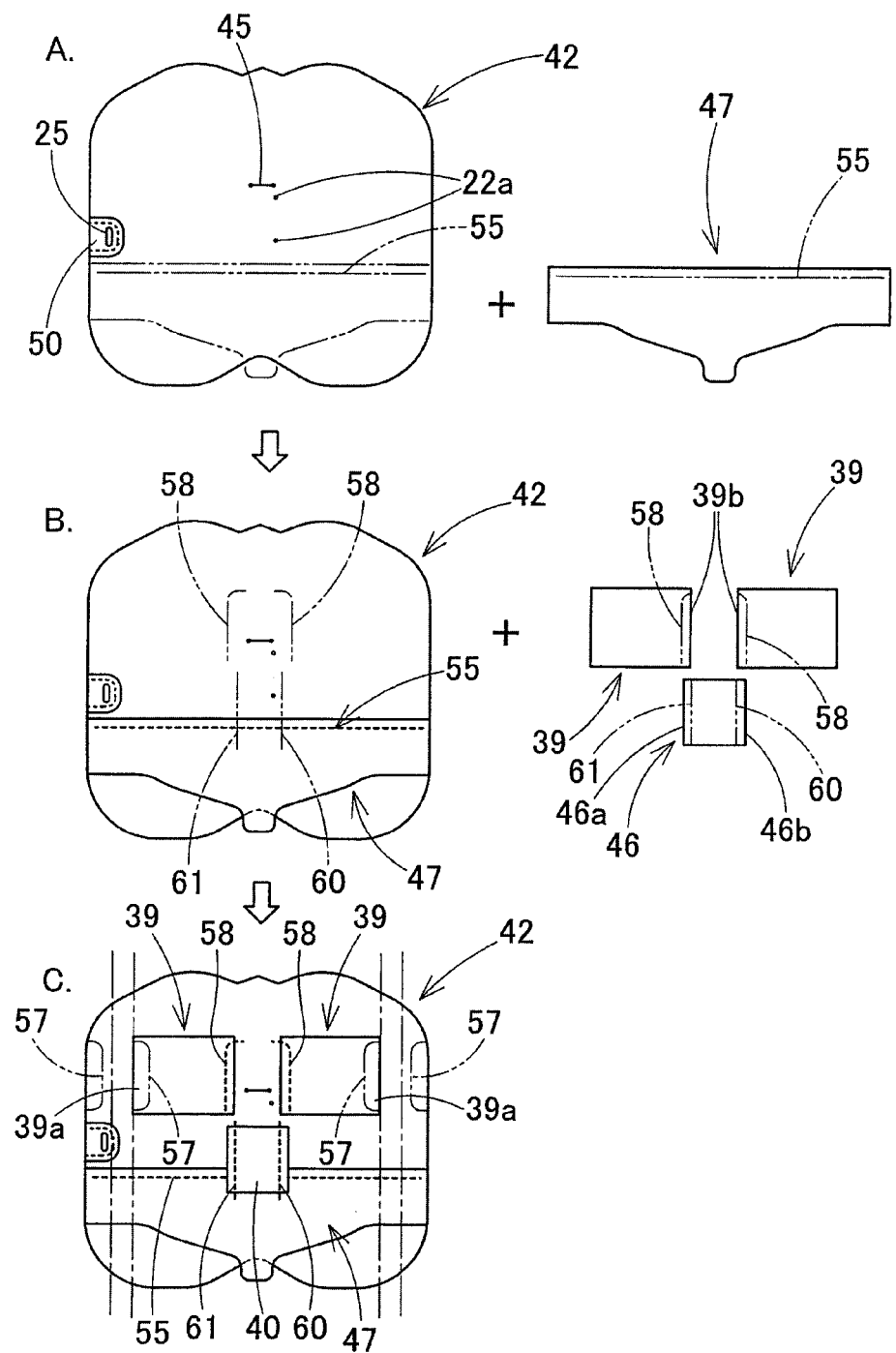
FIG. 9 is a schematic diagram explaining fabrication steps of a fabrication process of fabricating the airbag shown in FIG. 3.

Next, the fabrication of the airbag 15 of the embodiment will be described. The reinforcement cloth 50 is sewn to and the bent hole 25, the slit 45 making up the inserting opening 23 and the mounting holes 22a, 22a are formed in the main body base material 42 in advance. Firstly, as shown in Sections A and B of FIG. 9, the dividing wall base material 47 is superposed on an inner surface side of the main body base material 42 that is deployed flat. An upper edge side of the dividing wall base material 47 is sewn (joined) to the main body base material 42 by the use of a suture so as to form the upper joint portion 55. Next, as shown in Sections B and C of FIG. 9, the rear edge 39b sides of the restricting pieces 39 are sewn (joined) to the main body base material 42 by the use of a suture so as to form the rear side connecting portions 58. At the same time, the edge portion 46a, 46b sides of the inner tube base material 46 are sewn (joined) to the main body base material 42 so as to form the inboard joint portion 60 and the outboard joint portion 61. Thereafter, as shown in Section C of FIG. 9 and Section A of FIG. 10, both the edge side portions in the left-to-right direction of the main body base material 42 that is deployed flat (front edge sides of the inboard portion 43 and the outboard portion 44 when mounted on the vehicle) are folded to contract the widthwise dimension of the main body base material 42 in the left-to-right direction, and the front edge 39a sides of the restricting pieces 39 are sewn (joined) to the edge portion sides that are folded so as to form the front side connecting portions 57.

Figure 10:
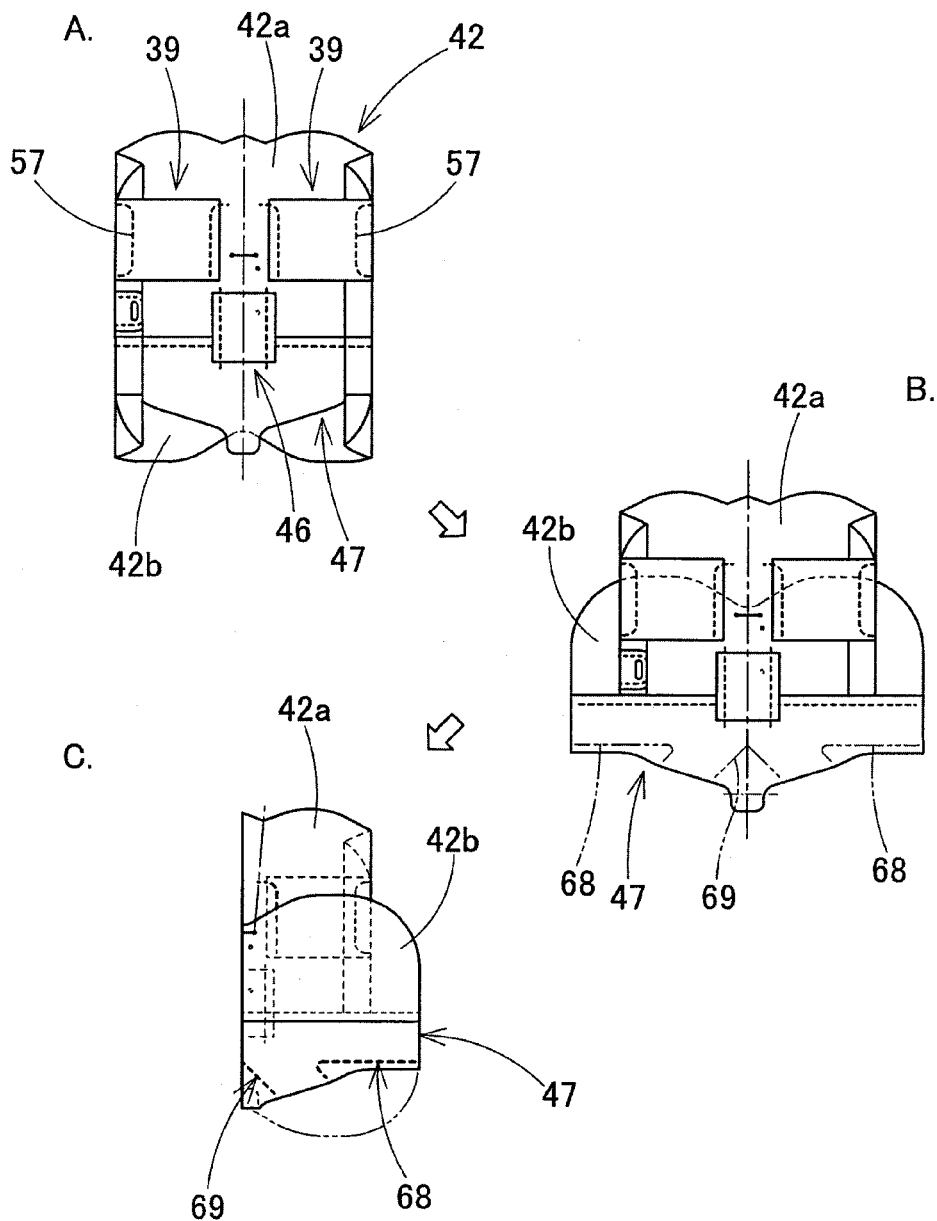
FIG. 10 is a schematic diagram explaining fabrication steps of the fabrication process of fabricating the airbag shown in FIG. 3 that are taken after the fabrication steps shown in FIG. 9.

Thereafter, the lower area 42b of the main body base material 42 that makes up the hip portion protecting portion 20 is folded near the portion where the upper joint portion 55 is provided so as to be brought into contact with the upper area 42a that makes up the chest portion protecting portion 21 on an outer surface side (refer to Section B of FIG. 10). With this folded state maintained, the upper area 42a is folded into two so that the outer circumferential edges of the folded upper area 42a coincide with each other while the inner surface sides thereof face each other. As this occurs, as shown in Section C of FIG. 10, the lower area 42b of the main body base material 42 that is folded is exposed on the outer surface side thereof, whereby the dividing wall base material 47 is exposed to the lower side of the main body base material 42 while being folded into two so that the outer circumferential edges of the inboard portion 31 and the outboard portion 32 coincide with each other. Then, the lower edge side portion of the dividing wall base material 47 that is folded into two (the lower edge 31b side of the inboard portion 31 and the lower edge 32b side of the outboard portion 32) are sewn together by the use of a suture so as to form the front side joint portion 68 and the rear side joint portion 69.

Figure 11:
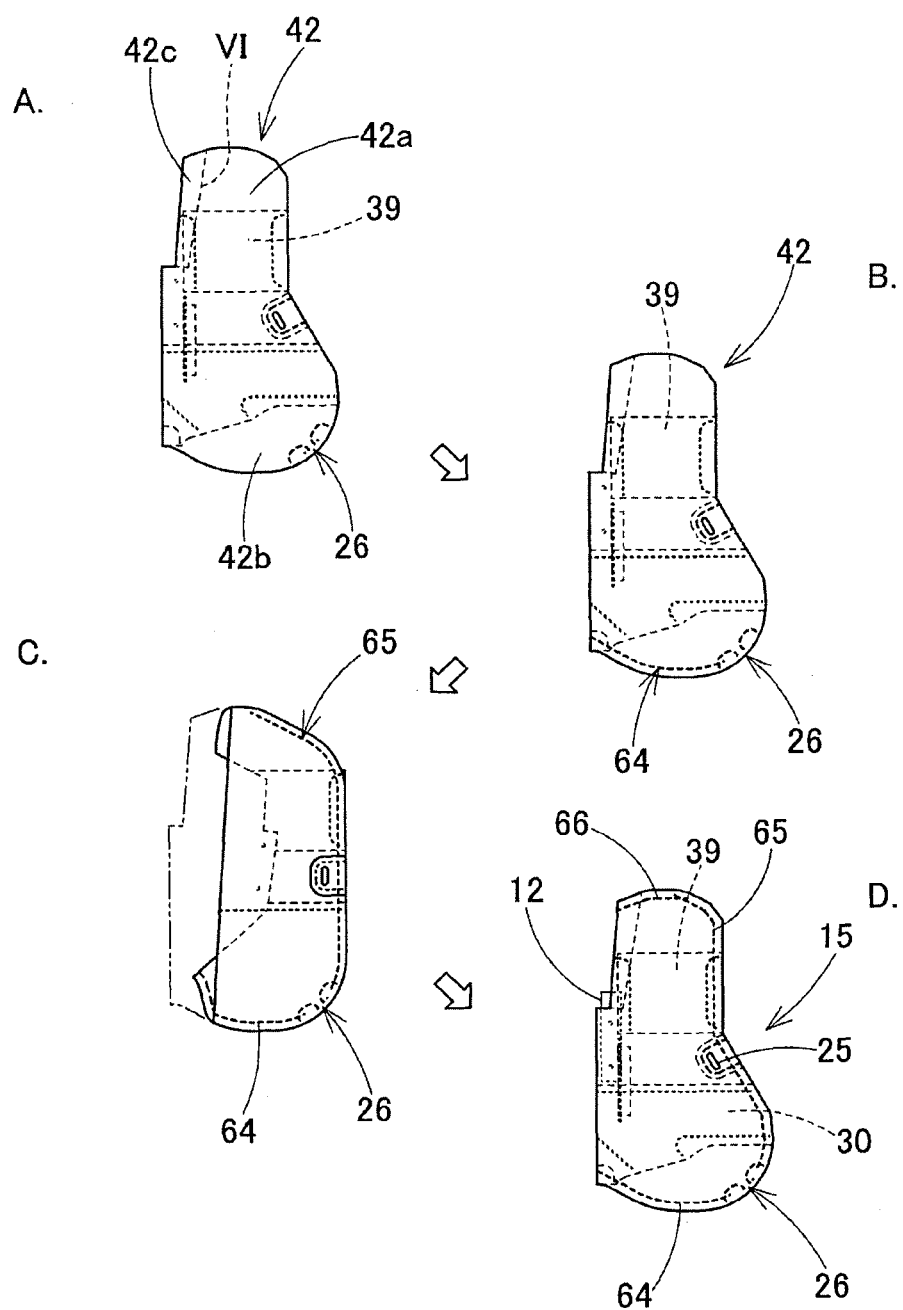
FIG. 11 is a schematic diagram explaining fabrication steps of the fabrication process of fabricating the airbag shown in FIG. 3 that are taken after the fabrication steps shown in FIG. 10.

Thereafter, the folded state of the lower side area 42b of the main body base material 42 is released, so that the whole of the main body base material 42 is put back to the state in which the main body base material 42 is folded into two (refer to Section A of FIG. 11). As this occurs, the lower area 42b is folded into two so that the outer circumferential edges coincide with each other with the internal surface sides caused to face each other in such a state that the dividing wall base material 47 is held therebetween. In addition, in the main body base material 42, the area on the upper side of the slit 45 (the upper central portion 42c) is folded inwards so that a fold V1 is allowed to be inside the folded area. Then, the front lower edge side of the outer circumferential edge of the main body base material 42 is sewn partially by the use of a suture to form the vent hole 26. Next, an area of the outer circumferential edge of the main body base material 42 that lies on a rear side of the vent hole 26 is sewn to the rear edge of the bag main body 16 by the use of a suture so as to form the lower side portion 64 of the circumferential edge joint portion 63 (refer to Section C of FIG. 11). As this occurs, the portions of the dividing wall base material 47 that lie on the rear lower end sides of the rear side joint portions 69 are also sewn together at the lower side portion 64. Thereafter, the portions of the main body base material 42 that lie from the front edge sides to the front upper edge sides are deployed flat so that the portions of the main body base material 42 that lie near the fold (the rear end side portion) are folded inwards. Then, the portions lying from the front edge sides to the front upper edge sides are sewn by the use of a suture so as to form the front side portions 65 of the circumferential edge joint portion 63. As this occurs, the front edge sides of the dividing wall base material 47 (the front edge 31c side of the inboard portion 31, the front edge 32c side of the outboard portion 32) are also sewn together at the front side portions 65, whereby the dividing wall 30 can be formed. Additionally, the portions of the restricting pieces 39 that lie near the front side connecting portions 57 are also sewn together at the front side portions 65. Next, the state of the portion of the main body base material 42 that lies near the fold is returned, and the retainer 12 is inserted into the interior of the bag main body 16 from the portion on the upper edge and rear end side of the bag main body 16 that is left not sewn so that the mounting bolts 12b project from the mounting holes 22a. Thereafter, the portion on the upper edge and rear end side of the bag main body 16 is sewn by the use of a suture to form an upper side portion 66 of the circumferential edge joint portion 63, whereby the airbag 15 with the retainer 12 inserted in the interior thereof can be fabricated as shown in Section D of FIG. 11.

Nest, the airbag 15 that is fabricated in the way described above is folded. Specifically speaking, the airbag 15 is folded from the state in which the airbag 15 is deployed substantially flat with the inboard wall portion 17 and the outboard wall portion 18 superposed on each other in such a way as to contract the widths in the up-to-down and front-to-rear directions. Firstly, as shown in Section A of FIG. 17, an upper side portion of the chest portion protecting portion 21 and a front edge side portion of the hip portion protecting portion 20 are folded onto the inboard wall portion 17, and a front upper corner portion of the airbag 15 so folded is folded onto the inboard wall portion 17 (refer to Section B of FIG. 17) to form an initially folded bag 105. Following this, as shown in Section A of FIG. 18, this initially folded bag 105 is folded so as to contract a widthwise dimension in the front-to-rear direction to form a folded bag 106 that is contracted in the front-to-rear direction. Specifically speaking, in the folded bag 106 that is contracted in the front-to-rear direction, a front end side area of the initially folded bag 105 is folded as being rolled up onto the outboard wall portion 18, and a rear end side of the initially folded bag 105 is folded as being corrugated. Thereafter, in the folded bag 106 that is contracted in the front-to-rear direction, as shown in Sections B and C of FIG. 18, a lower end 106a side portion that constitutes an area lying below the inflator 10 is folded substantially along the left-to-right direction to form a folded-over portion 108 that is folded back and forth three times. Then, the resulting folded-over portion 108 is folded so as to contract a widthwise dimension in the up-to-down direction, whereby a folded-up airbag body 107 can be formed in which the folded-over portion 108 is disposed at a lower end 107a side thereof, the resulting folded-up airbag body 107 being configured as an elongated body whose longitudinal direction follows substantially the up-to-down direction.

Figure 18:
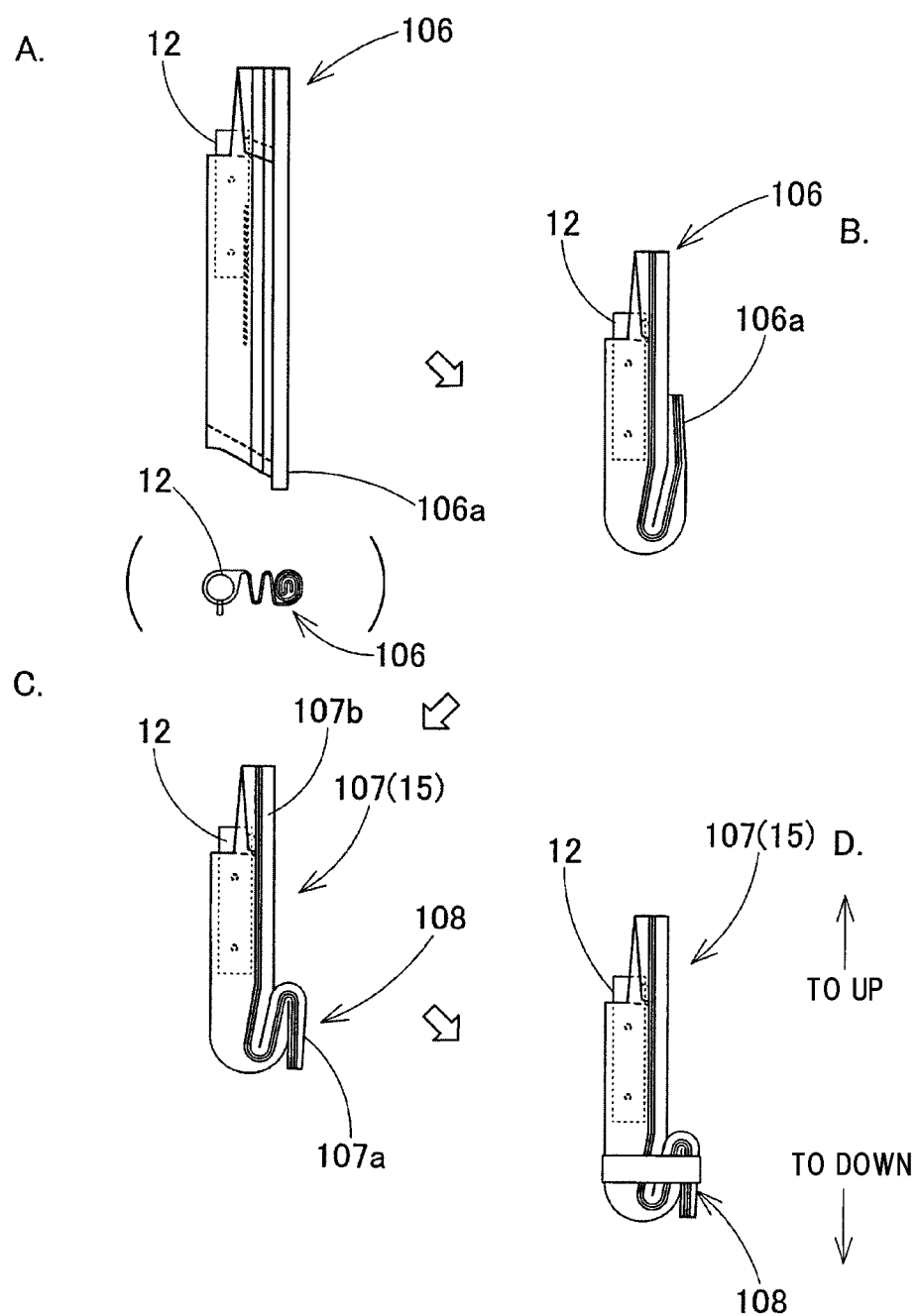
FIG. 18 is a schematic diagram explaining folding steps of the airbag of the embodiment that are taken after the folding steps shown in FIG. 17.

In the folded-up airbag body 107 formed by folding the airbag body 15 in the way described above, a folds collapsing preventive tape material (whose reference numeral is omitted in the figure) is wound around the circumference of the folded-over portion 108 so as to prevent the collapse of folds of the folded-over portion 108 (refer to Section C of FIG. 18). This tape material can easily be broken. Next, the inflator 10 is inserted into the folded-up airbag body 107 in such a way as to insert the main body 11 into the interior of the retainer 12 by way of the inserting opening 23, and the wrapping material 75 is wound around the circumference of the folded-up airbag body 107. Specifically speaking, an upper end 107b side of the folded-up airbag body 107 is inserted into the cylindrical portion 78 of the wrapping material 75. Then, the mounting pieces 77 that are disposed at both the end sides of the main body portion 76 are mounted on the folded-up airbag body 107 in such a way that the mounting bolts 12b project from the mounting holes 77a, and the main body portion 76 is wound around the circumference of the folded-up airbag body 107 (refer to Sections A and B of FIG. 19). Thereafter, as shown in Section C of FIG. 19, the connecting piece portion 86 is folded so as to cover an upper end face side of the folded-up airbag body 107, and the mounting bolt 12b is caused to project from the insertion hole 86a, whereby the wrapping material 75 can be wound around the circumference of the folded-up airbag body 107. As this occurs, the folded-over portion 108 that is disposed on the lower end 107a side of the folded-up airbag body 107 is exposed from the wrapping material 75.

Next, the restraint member 95 is disposed around the circumference of the folded-up airbag body 107 that is covered around the circumference by the wrapping material 75. Specifically speaking, as shown in Sections B and C of FIG. 20, the connecting portions 96 are connected to the folded-up airbag body 107 in such a way that the mounting bolts 12b project from the insertion holes 96a. Then, as shown in Sections C and D of FIG. 20, the loose portion 97 is wound around the circumference of the folded-up airbag body 107 towards the outboard side from the state in which the loose portion 97 is folded over itself along the ridge-like fold VM so that one part thereof cover another while maintaining the state in which the loose portion 97 is folded over itself so that one part thereof cover another at the ridge-like fold VM. Then, so as to maintain the state that the loose portion 97 is wound, the breakable tape (whose reference numeral is omitted in the figure) is wound around the circumference of the loose portion 97 (refer to Section E of FIG. 20), whereby the restraint member 95 can be disposed around the circumference of the folded-up airbag body 107.

Thereafter, the mounting bolts 12b that project from the restraint member 95 are caused to project from the seat frame 3 to be fastened with the nuts 8, and the lead wire 11c is connected to the upper end 11d of the main body 11 of the inflator 10, whereby the airbag system M can be mounted on the seatback 2 of the seat 1. After the airbag system M is mounted on the seat 1, the cushion 4 and the skins 5, 6 are mounted on the seat 1, whereby the seat 1 is built up completely to be mounted on the vehicle. In mounting the seat 1 on the vehicle, the lead wire 11c extending from the main body 11 of the inflator 10 is connected to a predetermined airbag activating circuit of the vehicle.

After the airbag system M is mounted on the vehicle, a predetermined signal is inputted into the main body 11 of the inflator 10 by way of the lead wire 11c, whereby the inflation gas is discharged from the gas discharge port 11e that is formed in the small-diameter portion 11b of the main body 11. Then, the airbag 15 breaks the break planned portion 80 of the rapping material 75 and then pushes open the edge portion 4a of the cushion 4 so that the edge portion 4a is separated from the central portion 4b while breaking the break planned portion 99 of the restraint member 95, projecting to the front, whereby the airbag 15 inflates greatly between an inboard wall, not shown, of the vehicle and the occupant P as shown in FIGS. 23 and 24.

Figure 22:
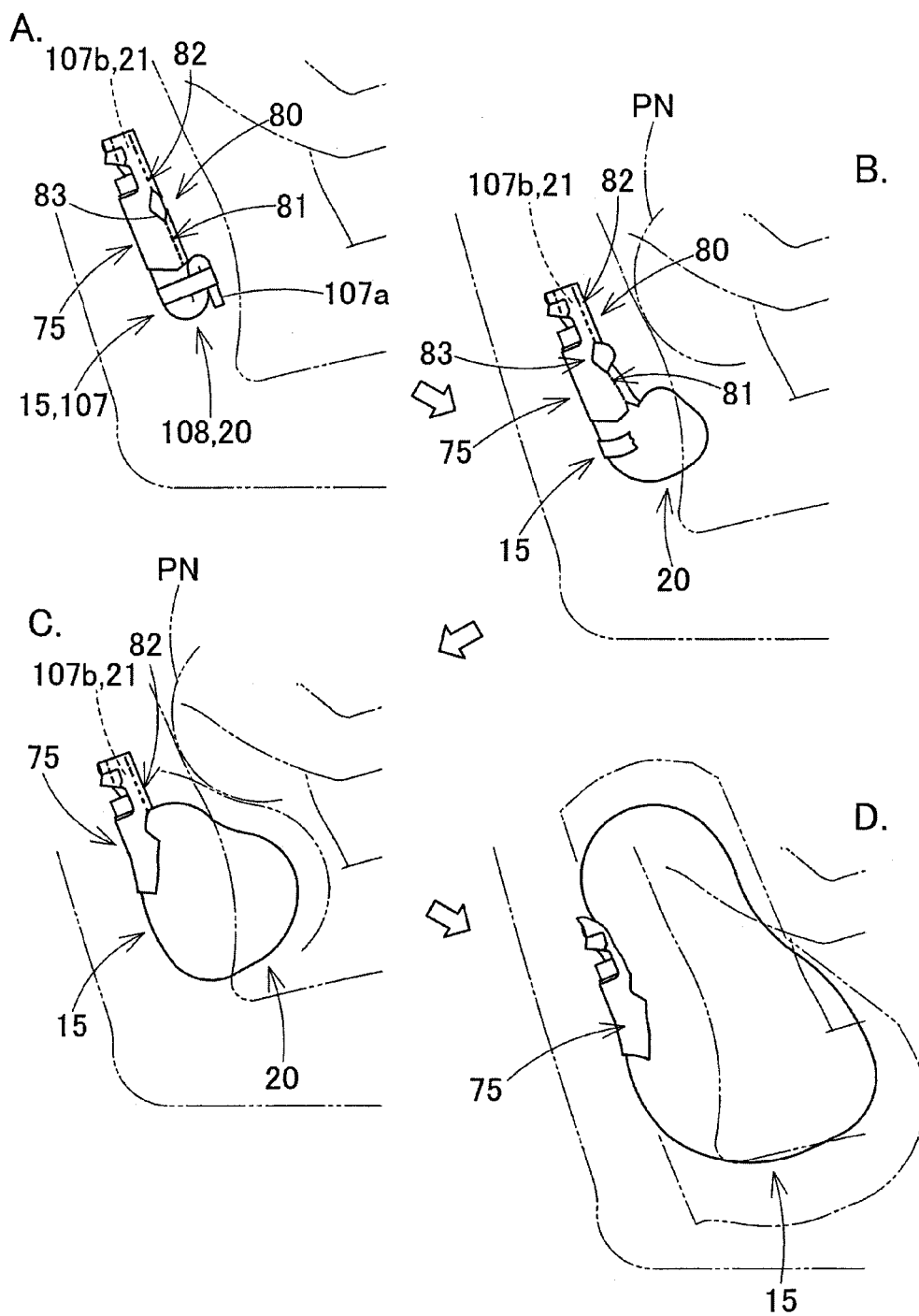
FIG. 22 is a schematic diagram explaining states of the wrapping material in the initial stage of inflation of the airbag in the side airbag system of the embodiment.

Thus, in the airbag system M of this embodiment, since the break planned portion 80 that is formed on the wrapping material 75 has the high-strength portion 82 where the break strength is set high, when the airbag 15 inflates, this high-strength portion 82 has difficulty in breaking, and the inflating airbag 15 is temporarily restrained from projecting to the front by the wrapping material 75. Thereafter, the airbag 15 is allowed to project to the front by breaking the high-strength portion 82. Owing to this, since the airbag 15 inflates while being restrained from projecting greatly to the front at the portion (in the case of this embodiment, the chest protecting portion 21) where the high-strength portion 82 is provided in the initial stage of inflation as shown in Sections B and C of FIG. 22, even though the airbag 15 inflates with an obstacle PN such as an occupant lying close in front of the accommodating portion 2b as indicated by chain double-dashed lines in the figures (the obstacle close positioned state), in case a configuration is adopted in which the high-strength portion 82 is provided in the position corresponding to the obstacle PN, the obstacle PN can be restrained from being pressed strongly by the inflating airbag 15.

Consequently, according to the airbag system M of this embodiment, in the case of the obstacle PN lying close to the airbag system M, the obstacle PN can be restrained from being pressed strongly by the airbag 15.

According to the airbag system M of this embodiment, the break planned portion 80 has the low-strength portion 81 where the break strength is set low, and the low-strength portion 81 breaks quickly when the airbag 15 inflates. Owing to this, in the event that the airbag 15 inflates with the occupant P sitting in the seat 1 (the normal occupant protection), the whole of the break planned portion 80 is allowed to break quickly in association with the quick breakage of the low-strength portion 81, whereby the airbag 15 is allowed to complete its inflation without a great delay from the inflation completing time necessary to protect the occupant accurately. As a result, in the normal occupant protection, the airbag 15 is allowed to inflate quickly, whereby the occupant P sitting in the seat 1 can be protected accurately by the airbag 15 that completes its inflation.

According to the airbag system M of this embodiment, in the event that the opening portion 83 that constitutes the originating point of break is disposed between the low-strength portion 81 and the high-strength portion 82, the low-strength portion 81 and the high-strength portion 82 can start breaking separately according to their strengths from the opening portion 83 as the originating point of break. Therefore, it is possible to provide the accurate time difference in break starting timing between the low-strength and high-strength portions. In particular, in the airbag system M of this embodiment, the opening portion 83 is given the diamond-like shape in which the longitudinal direction substantially follows the up-to-down direction, and the low-strength portion 81 and the high-strength portion 82 continue from the corresponding acute apexes 83a, 83b of the diamond-shaped opening portion 83. In this configuration, stress tends to easily concentrate at the portions where the acute apexes 83a, 83b are provided, whereby the low-strength portion 81 and the high-strength portion 82 are allowed to start breaking smoothly from the apexes 83a, 83b as originating points of break. In this embodiment, the cutout portion is provided at the lower edge 76a side portion of the main body portion 76, and therefore, the low-strength portion 81 also starts breaking from the lower edge 76a side of the main body portion 76 as an originating point of break, whereby in the low-strength portion 81, breaks can be propagated quickly from both the upper and lower sides, and hence, the whole of the low-strength portion 81 can be broke quickly. Unless this point is taken into consideration, the external shape of the opening portion is not limited to the diamond-like shape, and hence, an elliptic shape may be adopted for example. Further, a break planned portion may be adopted in which the low-strength portion continues directly to the high-strength portion without providing the opening portion therebetween.

According to the airbag system M of this embodiment, the wrapping material 75 is designed to expose the lower end 107a side of the folded-up airbag body 107, and the low-strength portion 81 is provided close to the folded-over portion 108 of the folded-up airbag body 107 that constitutes the exposed portion. Owing to this, the folded-over portion 108 that is exposed from the wrapping material 75 is allowed to inflate quickly in the initial stage of inflation of the airbag 15. Additionally, the low-strength portion 81 of the break planned portion 80 that is formed on the wrapping material 75 is provided close to the folded-over portion 108, and therefore, when the folded-over portion 108 inflates, the break planned portion 80 breaks sequentially from the low-strength portion 81, and the airbag 15 is allowed to inflate so as to project greatly to the front while breaking the break planned portion 80 quickly.

In particular, according to the airbag system M of this embodiment, the folded-over portion 108 that is disposed so as to be exposed from the wrapping material 75 is made by folding the hip portion protecting portion 20 that can bear the hip portion H of the occupant P when it inflates. Owing to this, the hip portion protecting portion 20 that is exposed from the wrapping material 75 is allowed to inflate quickly in the initial stage of inflation of the airbag 15 (refer to Sections B and C of FIG. 22), whereby the hip portion H of the occupant P, whose mass and kinetic energy in motion are greater than those of the chest portion, can be retrained quickly.

In this embodiment, the wrapping material 75 is formed of the flexible woven cloth, and the break planned portion 80 is formed by making the broken slit-shaped cuts 81a, 82a in the woven cloth. Then, the break strengths of the low-strength portion 81 and the high-strength portion 82 of the break planned portion 80 are controlled by changing the lengthwise dimensions of the cuts 81a, 82a and the spacing distances between the cuts 81a, 82a (the widthwise dimensions of the inter-cut portions 81b, 82b). However, the wrapping material is not limited to cloth, provided that the wrapping material is made of any flexible sheet material. For example, the wrapping material may be made of a synthetic resin film member. Additionally, the break planned portion does not necessarily have to be made up of the broken slit-shaped cuts. In the event that the wrapping material is made of a film member, the break planned portion may be formed by making the film member thin continuously. As this occurs, the break strengths of the low-strength portion and the high-strength portion may be controlled by changing the thickness of the thin film member.

Figure 25:
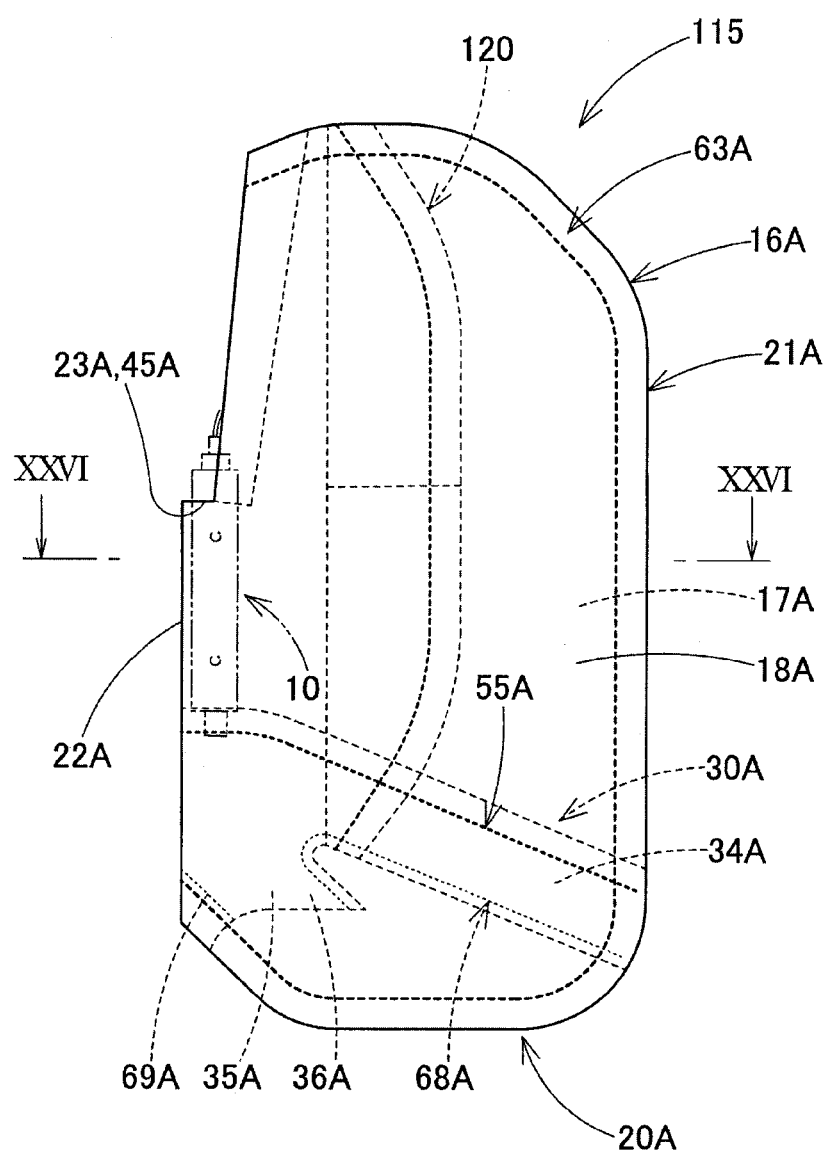
FIG. 25 is a front view of an airbag according to another embodiment of the invention.
Figure 26:
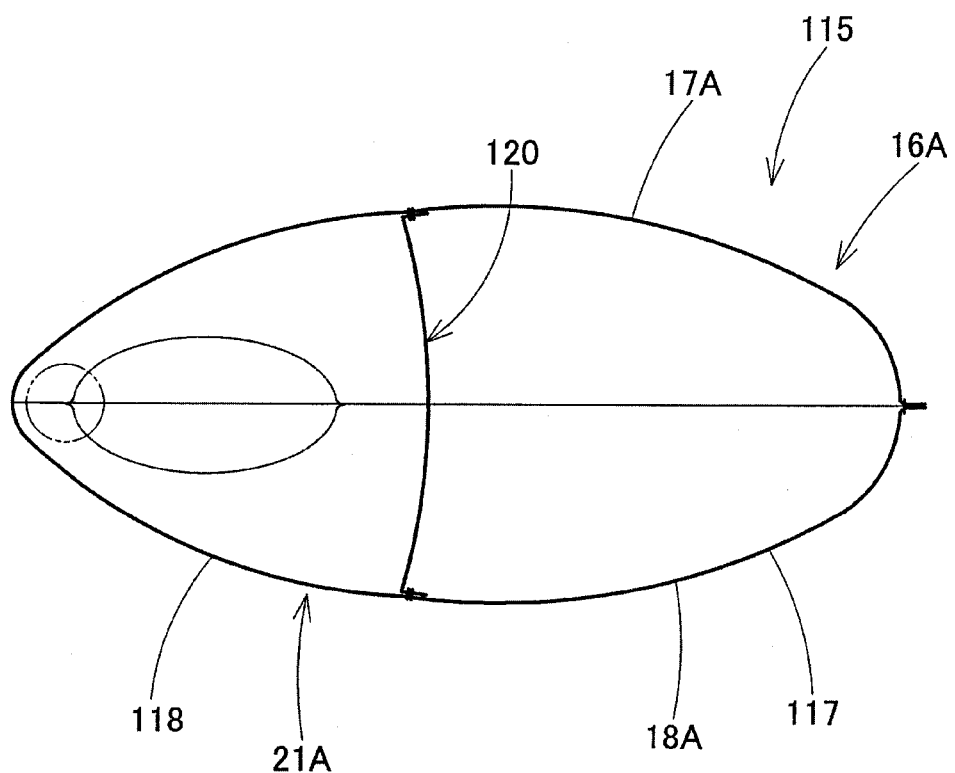
FIG. 26 is a sectional view of the airbag taken along a portion XXVI-XXVI in FIG. 25.
Figure 27:
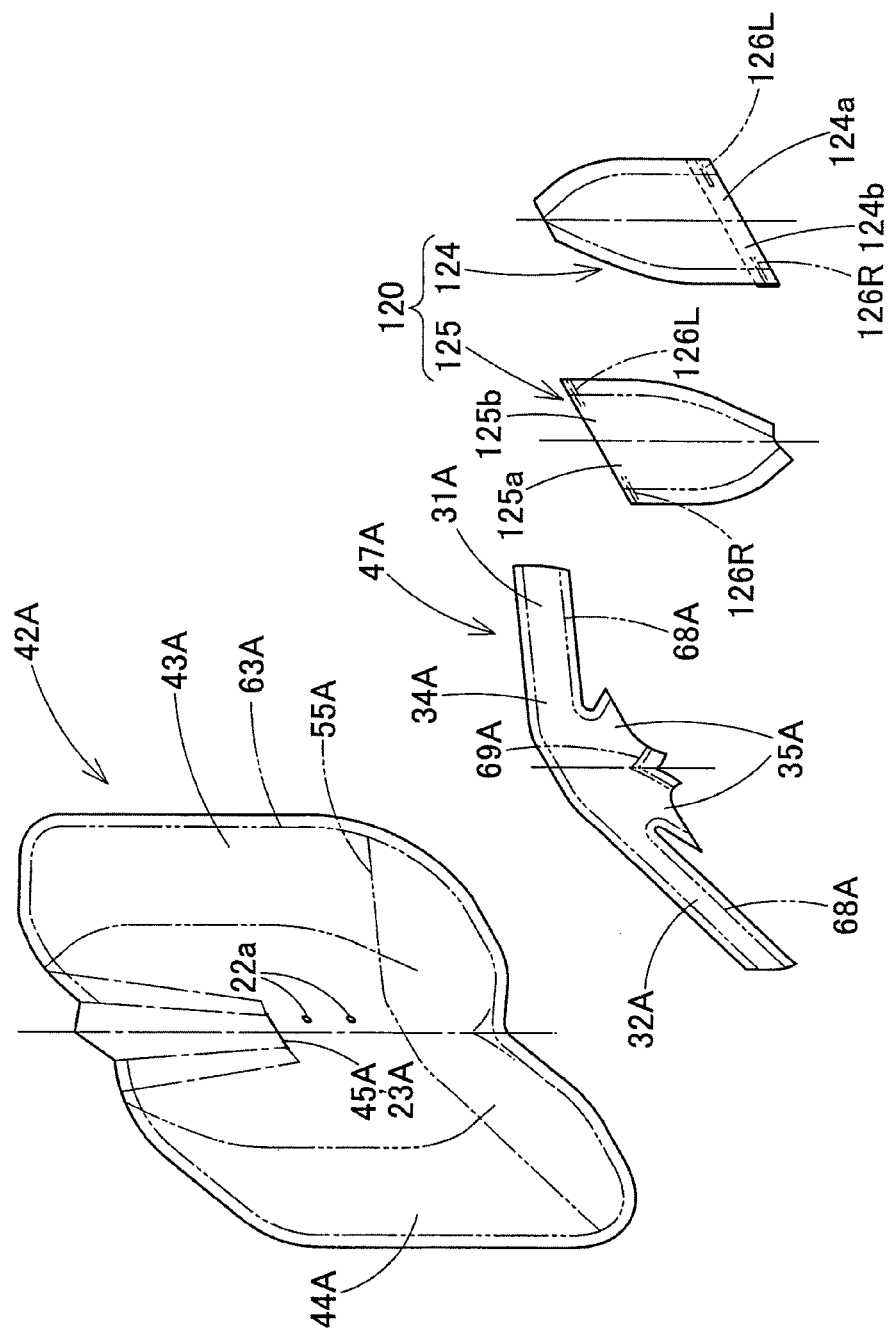
FIG. 27 is a schematic exploded perspective view of base materials that make up the airbag shown in FIG. 25.

An airbag 115 shown in FIGS. 25 to 27 may be used. The airbag 115 includes a bag main body 16A, a dividing wall 30A and a front-and-rear dividing wall 120. The bag main body 16A and the dividing wall 30A are similar in configuration to the bag main body 16 and the dividing wall 30 of the airbag 15, and therefore, like reference numerals suffixed with "A" will be given to like members, so that the description thereof will be omitted here.

Figure 29:
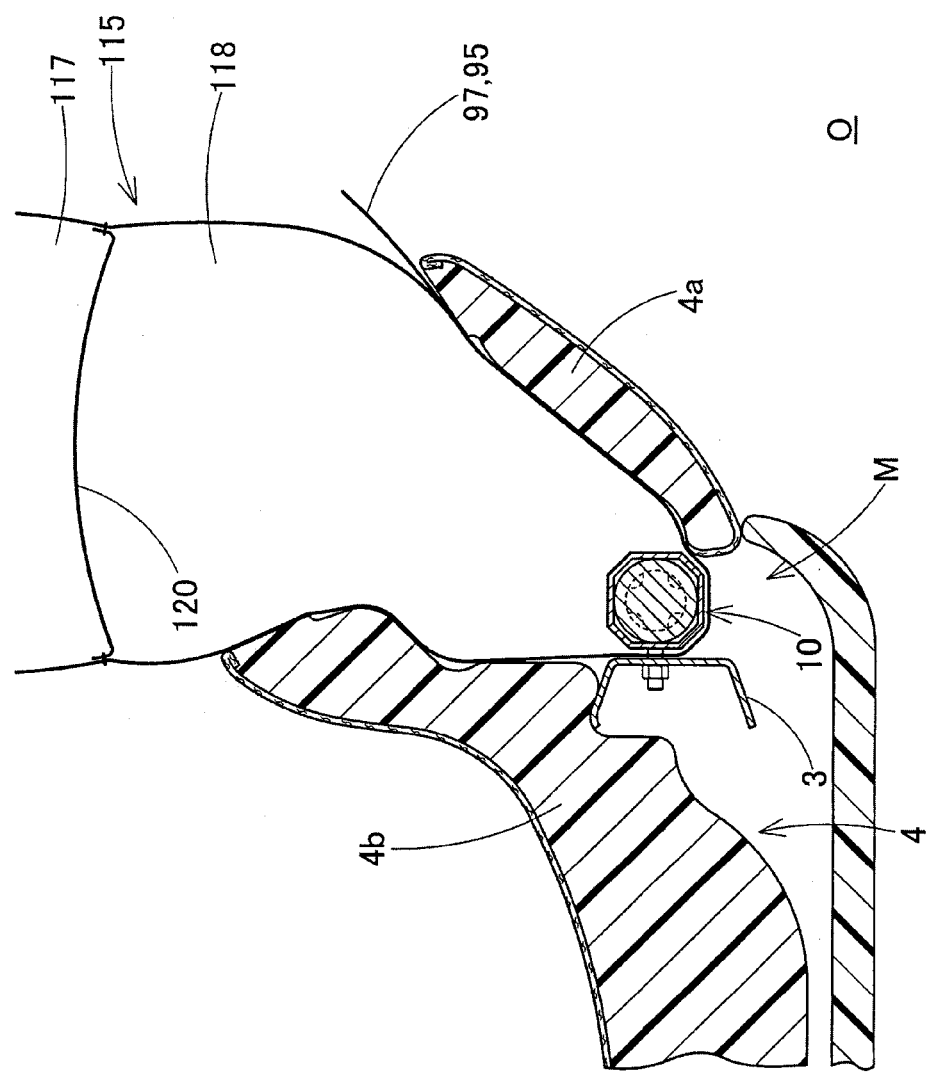
FIG. 29 is a schematic cross-sectional view of the side airbag system that uses the airbag shown in FIG. 25, showing a state in which the airbag completes its inflation.

As shown in FIGS. 25 and 26, the front-and-rear dividing wall 120 is provided to substantially follow an up-to-down direction within a chest portion protecting portion 21A so as to divide an interior area of the chest portion protecting portion 21A into a front side portion and a rear side portion. The front-and-rear dividing wall 120 is joined (sewn) to the chest portion protecting portion 21A along a full circumference of an outer circumferential edge. To describe this in detail, the front-and-rear dividing wall 120 is joined (sewn) to a inboard wall portion 17A and an outboard wall portion 18A along the outer circumferential edge excluding a lower edge side thereof, and the lower edge side is joined (sewn) to the dividing wall 30A that divides the interior of the airbag 115 into the chest portion protecting portion 21A and a hip portion protecting portion 20A. To describe this in detail, the lower edge side of the front-and-rear dividing wall 120 is sewn to a position lying near a front end of a communicating portion 35A of a dividing wall main body 34A. This front-and-rear dividing wall 120 is disposed so as to substantially follow the up-to-down direction along a rear edge of the bag main body 16A in a position that is situated slightly further rearwards than a center of the chest portion protecting portion 21A in a front-to-rear direction when the airbag 115 completes its inflation. Namely, in the airbag 115, the chest portion protecting portion 21A is divided into a front side portion 117 and a rear side portion 118 by the front-to-rear dividing wall 120. The front-and-rear dividing wall 120 is disposed forwards of a seatback 2 in a position that is situated near a front end 2c of the seat back 2 when the airbag 115 completes its inflation (refer to FIGS. 29 and 30). The rear side portion 118 is designed to cover a side of a shoulder portion S of the occupant P to restrain the shoulder portion S when the rear side portion 118 inflates.

Figure 28:
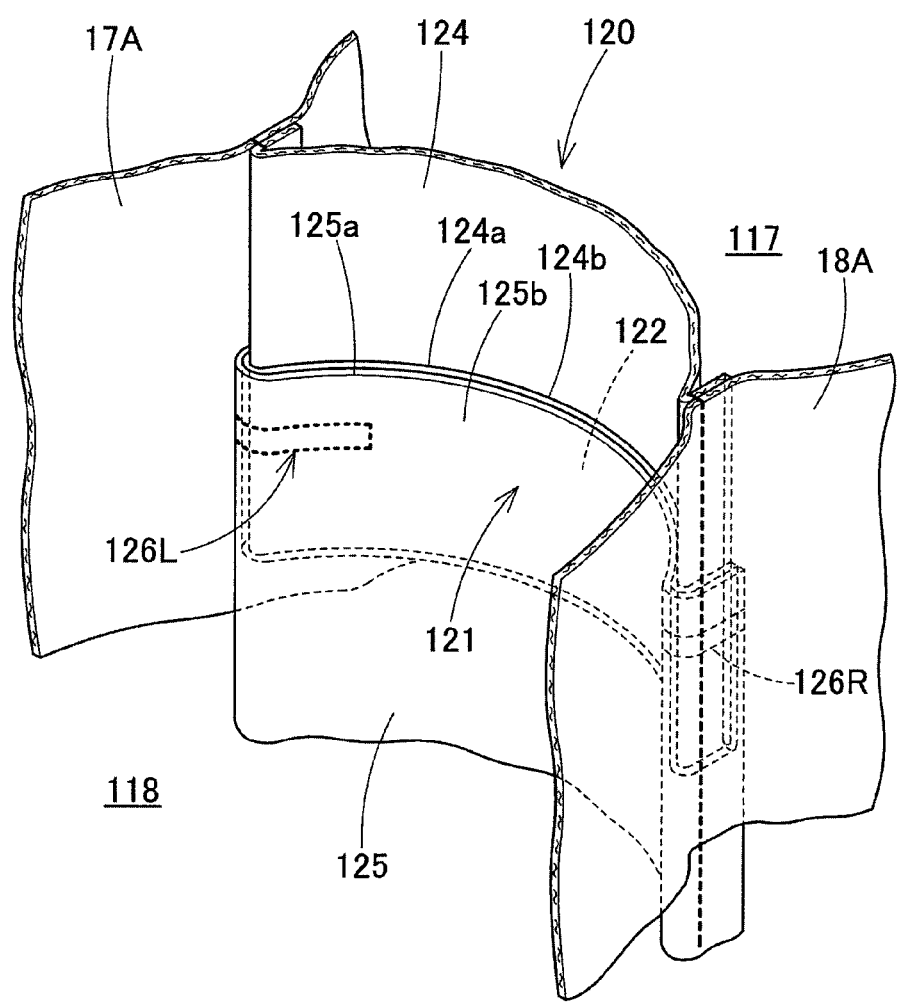
FIG. 28 is a partially enlarged schematic perspective view showing a portion of the airbag shown in FIG. 25 where a valve mechanism is formed on a front-to-rear dividing wall.
Figure 30:
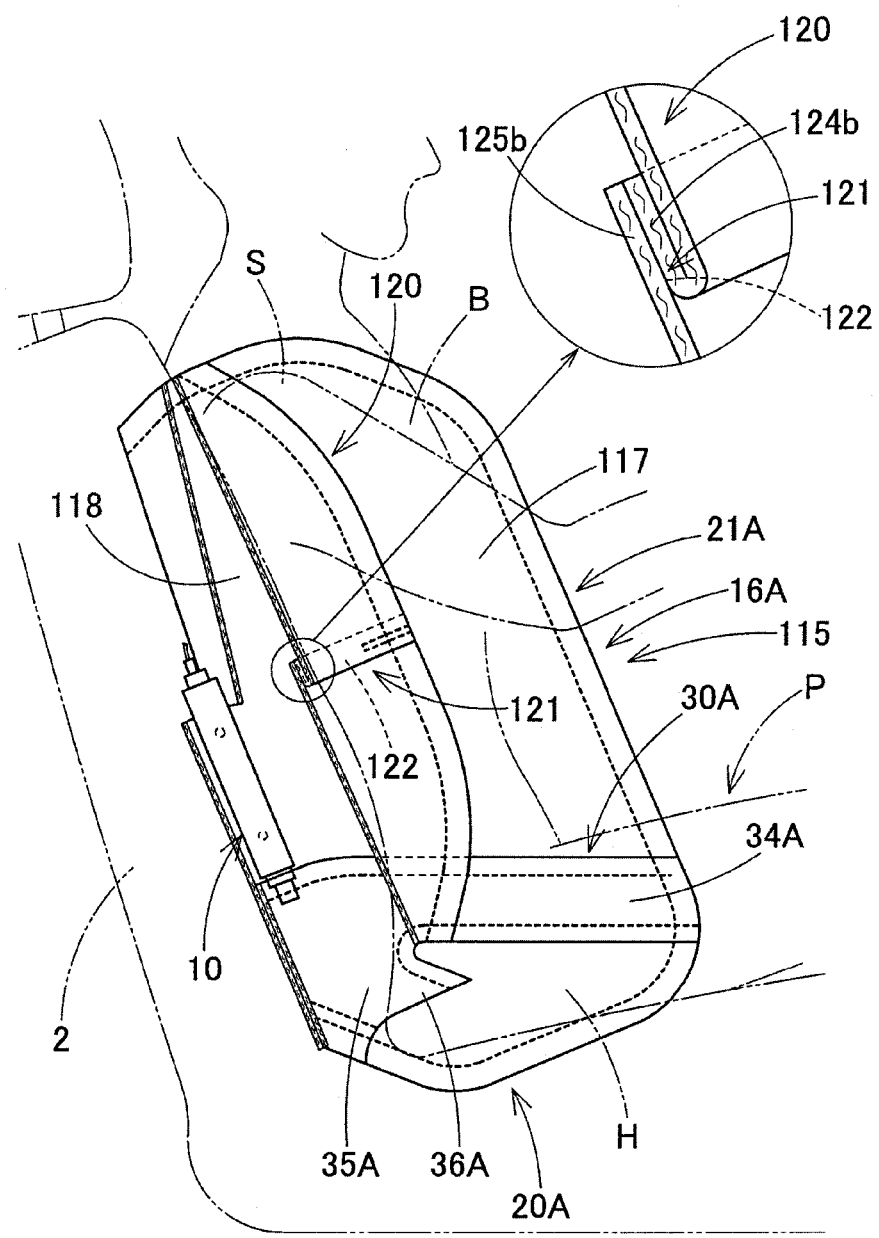
FIG. 30 is a schematic vertical sectional view of the side airbag system that uses the airbag shown in FIG. 25, showing a state in which the airbag completes its inflation.
Figure 31:
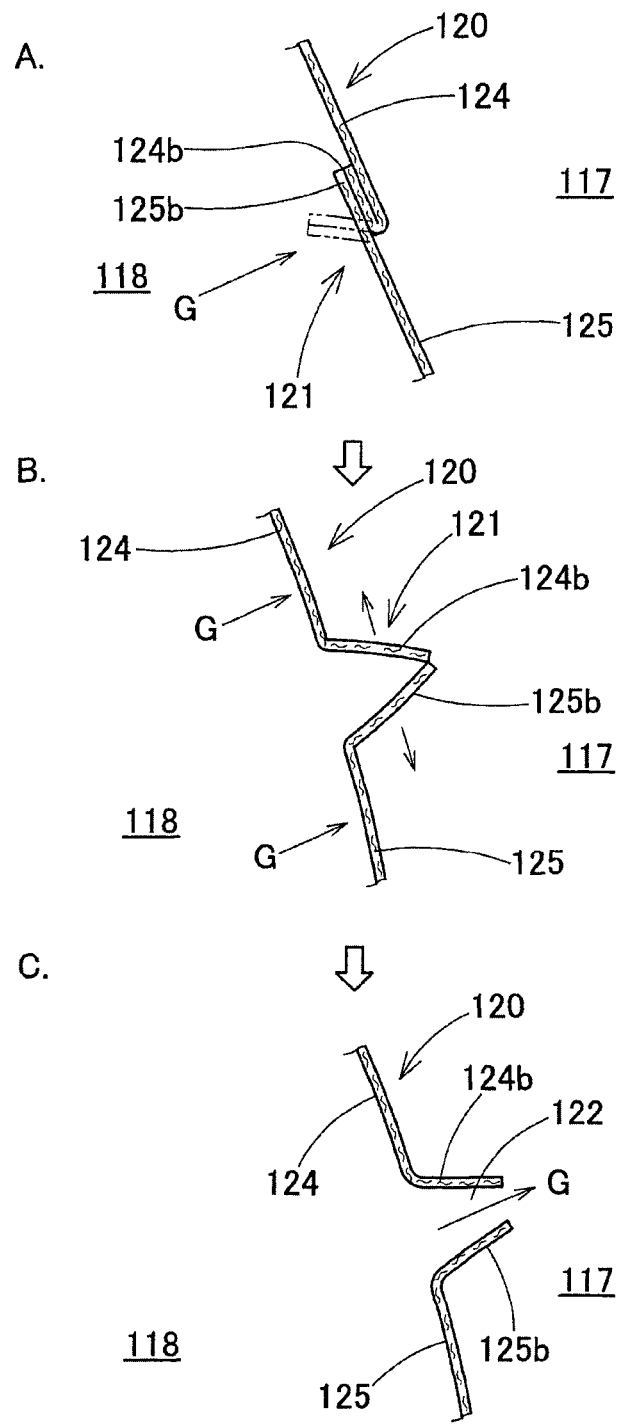
FIG. 31 is a partially enlarged sectional view of the airbag shown in FIG. 25, showing the operation of the valve mechanism formed on the front-to-rear dividing wall.

As shown in FIGS. 28, 30 and 31, the front-and-rear dividing wall 120 includes a valve mechanism 121 that can control an internal pressure of the rear side portion 118 of the chest portion protecting portion 21A and a communicating portion 122 that is opened when the valve mechanism 121 is opened. In the case of this embodiment, the front-and-rear dividing wall 120 is made by providing two dividing wall base materials 124, 125 so as to be aligned with each other in the up-to-down direction (refer to FIGS. 27 and 30). With a lower edge 124a of the upper dividing wall base material 124 and an upper edge 125a of the lower dividing wall base material 125 made to coincide with each other, portions of the upper and lower dividing wall base materials 124, 125 that lie near the lower edge 124a and the upper edge 125a are sewn (joined) continuously along a left-to-right direction excluding portions that lie near their centers in the left-to-right direction by the use of a suture. Thus, in the case of this embodiment, the upper dividing wall base material 124 is superposed on the upper edge 125a of the lower dividing wall base material 125 with the lower edge 124a turned upwards (refer to FIG. 28). Then, the dividing wall base materials 124, 125 are joined to the chest portion protecting portion 21A (the inboard wall portion 17A, the outboard wall portion 18A) along outer circumferential edges with the turned state of the upper dividing wall base material 124 maintained. Then, the portions of the dividing wall base materials 124, 125 that lie near their centers in the left-to-right direction and which are left not sewn (a space between joined portions 126L, 126R) make up the communicating portion 122, and circumferential edge portions 124b, 125b that make up a circumferential edge of the communicating portion 122 (the space) on the lower edge 124a of the upper dividing wall material 124 and the upper edge 125a of the lower dividing wall material 125 make up the valve mechanism 121. Namely, in this embodiment, the front-and-rear dividing wall 120 is formed into the elongated shape by sewing together two dividing wall base materials 124, 125 that are provided so as to be aligned with each other along the longitudinal direction (the up-to-down direction) along the adjacent edge portions (the lower edge 124a, the upper edge 125a) excluding the portions lying near their centers in the left-to-right direction and disposing the joined portions 126L, 126R where the lower edge 124a and the upper edge 125a are sewn together substantially along the left-to-right direction.

In this airbag 115, when an inflation gas G is discharged from the inflator 10, firstly, the rear side portion 118 of the chest portion protecting portion 21A inflates by letting the inflation gas G into the interior thereof. Following this, the hip portion protecting portion 20A inflates by letting the inflation gas G into an interior thereof by way of a communicating portion 35A that is formed in the dividing wall 30A. As this occurs, the front-and-rear dividing wall 120 that divides the chest portion protecting portion 21A into the front side portion 117 and the rear side portion 118 takes substantially the form of a belt that is long along the up-to-down direction. Therefore, when the rear side portion 118 inflates, a great magnitude of tensile force is exerted along the direction of a shorter side (the left-to-right direction). Namely, when the rear side portion 118 inflates, the tensile force is exerted on the front-and-rear dividing wall 120 along the joined portions 126L, 126R that are disposed on the left- and right-hand sides of the valve mechanism 121 by sewing together the lower edge 124a of the upper dividing wall base material 124 and the upper edge 125a of the lower dividing wall base material 125. This tensile force maintains the stretched stats of the circumferential edge portions 124b, 125b that makes up the circumferential edge of the communicating portion 122, so that a closed state of the valve mechanism 121 is maintained (refer to Section A of FIG. 31).

In this airbag 115, when the internal pressure of the rear side portion 118 is increased as a result of the rear side portion 118 bearing the shoulder portion S of the occupant P with the rear side portion 118 and the hip portion protecting portion 20A completing their inflations, the valve mechanism 121 formed in the front-and-rear dividing wall 120 is opened. Specifically speaking, when the internal pressure of the rear side portion 118 is increased as a result of an inboard portion of the rear side portion 118 (a rear side area of the inboard wall portion 17A) bearing the shoulder portion S of the occupant P, the front-and-rear dividing wall 120 is pressed against by the front side portion 117 to be deformed. Then, the circumferential portions 124b, 125b of the communicating portion 122 in the dividing wall base materials 124, 125 are opened as openings thereof are forced open, whereby the circumferential edge portions 124b, 125b are pushed out (turned out) to the front side portion 117 through the communicating portion 122 (refer to Section B of FIG. 31). This opens the valve mechanism 121 to open the communicating portion 122, whereby as shown in Section C of FIG. 31, the inflation gas G flows into the front side portion 117 by way of the communicating portion 122 that is so opened.

The airbag 115 that is configured in the way described heretofore is folded into a folded-up airbag body and is then covered around a circumference thereof by a wrapping material 75 for accommodation in the seatback 2. Then, in the airbag 115 configured in the way described above, the chest portion protecting portion 21A inflates temporarily widely in the up-to-down direction only in the rear side portion 118 in the initial stage of inflation of the airbag 115. The valve mechanism 121 that is formed in the front-and-rear dividing wall 120 is kept closed before the shoulder portion S of the occupant P is borne by the rear side portion 118, whereby the front side portion 117 is restrained from inflating. This restrains the airbag 115 from projecting greatly to the front in the initial stage of inflation thereof in a more accurate fashion in cooperation with the wrapping material 75.

In the airbag system M of this embodiment, further, the restraint member 95 configured to restrain the airbag 15 from projecting to the front when the airbag 15 inflates is disposed around the outer circumferential side of the wrapping material 75 so as to work in cooperation with the wrapping material 75 so that the airbag 15 is restrained from projecting greatly to the front in the initial stage of inflation thereof. However, an airbag system may be provided in which the restraint member is not disposed.

What is claimed is:

1. A side airbag system comprising:
an airbag that is folded up to be accommodated in an accommodating portion that is formed in a seatback of a seat of a vehicle and which is configured to inflate while projecting to the front by allowing an inflation gas to enter an interior thereof; and
a wrapping material that is disposed around a folded-up airbag body into which the airbag is folded so as to prevent the collapse of neatly arranged folds of the folded-up airbag body, the folded-up airbag body being configured as an elongated body having an external shape that is disposed so that a longitudinal direction thereof substantially follows an up-to-down direction, wherein:
the wrapping material is formed of a flexible sheet material and is disposed so as to wrap around the folded-up airbag body, including a break planned portion capable of breaking when the airbag inflates which is provided on a front surface side of the folded-up airbag body so as to substantially follow the up-to-down direction; and
the break planned portion comprises a low-strength portion where a break strength thereof is set low and a high-strength portion where the break strength is set high,
wherein:
the wrapping material is configured to expose at least one end portion of the folded-up airbag body in the up-to-down direction; and
the low-strength portion is provided close to an exposed portion of the folded-up airbag body.

2. The side airbag system according to claim 1, wherein an opening portion constituting an originating point of a break is formed between the low-strength portion and the high-strength portion.

3. The side airbag system according to claim 1, wherein a gas discharge port is located at a position situated near the low-strength portion.

4. The side airbag system according to claim 3, wherein the low-strength portion extends toward an outer periphery of the wrapping material.

5. The side airbag system according to claim 1, wherein the low-strength portion extends toward an outer periphery of the wrapping material.

6. The side airbag system according to claim 1, wherein wherein the at least one end portion which is exposed from the wrapping material is a folded-over portion of the folded-up airbag body.

7. The side airbag system according to claim 1, wherein the wrapping material is disposed to cover substantially a whole area of a circumference of the folded-up airbag body excluding the at least one end portion of the folded-up airbag body in the up-to-down direction,
wherein the at least one end portion which is exposed from the wrapping material is a folded-over portion of the folded-up airbag body.

* * * * *